(12) United States Patent
Shin et al.

(10) Patent No.: US 10,730,504 B2
(45) Date of Patent: Aug. 4, 2020

(54) VEHICLE AND METHOD FOR CONTROLLING THE VEHICLE

(71) Applicants: HYUNDAI MOTOR COMPANY, Seoul (KR); KIA MOTORS CORPORATION, Seoul (KR)

(72) Inventors: Dong Jun Shin, Hwaseong-si (KR); Jeewook Huh, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 266 days.

(21) Appl. No.: 15/825,627

(22) Filed: Nov. 29, 2017

(65) Prior Publication Data
US 2019/0071068 A1 Mar. 7, 2019

(30) Foreign Application Priority Data
Sep. 7, 2017 (KR) .................. 10-2017-0114561

(51) Int. Cl.
*B60W 20/12* (2016.01)
*B60W 20/13* (2016.01)
(Continued)

(52) U.S. Cl.
CPC ............ *B60W 20/12* (2016.01); *B60W 20/13* (2016.01); *B60L 15/2045* (2013.01);
(Continued)

(58) Field of Classification Search
CPC ............ G01C 21/26; G01C 21/3469; G01C 21/3492; G01C 21/3602; G01C 21/3697; G01C 21/3407; G01C 23/005; G01C 23/00; B60K 16/00; B60K 35/00; H02J 7/35; B60L 8/003; B60L 15/2045; B60L 58/12; G08G 1/096827; G08G 1/096844;
(Continued)

(56) References Cited

U.S. PATENT DOCUMENTS 9,310,222 B1 * 4/2016 Suiter .................. G01C 23/005
10,248,120 B1 * 4/2019 Siegel ................ G01C 21/3602
(Continued)

FOREIGN PATENT DOCUMENTS

JP      2012-194136 A    10/2012
JP      2015-123749 A     7/2015
(Continued)

*Primary Examiner* — Behrang Badii
(74) *Attorney, Agent, or Firm* — Morgan, Lewis & Bockius LLP

(57) ABSTRACT

A vehicle includes an engine for applying a driving force to a vehicle wheel, a speed detector for detecting a driving speed, a slope detector for detecting a slope of a road, an input for receiving a departure command and an arrival command, and a controller, when a route addition mode is selected, acquiring and storing road condition information of a route between a departure time and an arrival time based on a driving speed and a slope of the road, which is detected from when the departure time at which the departure command is received until the arrival time at which the arrival command is received, and the controller, when a route driving mode is selected, controlling driving of the engine based on the stored road condition information of the road.

10 Claims, 18 Drawing Sheets

(51) Int. Cl.

| | | |
|---|---|---|
| G01C 21/36 | (2006.01) | |
| G06F 17/00 | (2019.01) | |
| B60L 15/20 | (2006.01) | |
| G05D 1/02 | (2020.01) | |
| G05D 1/00 | (2006.01) | |
| G01C 21/34 | (2006.01) | |
| G08G 1/0968 | (2006.01) | |
| H02J 7/35 | (2006.01) | |

(52) U.S. Cl.
CPC ..... *B60W 2520/10* (2013.01); *B60W 2552/15* (2020.02); *G01C 21/3469* (2013.01); *G01C 21/3602* (2013.01); *G01C 21/3697* (2013.01); *G05D 1/00* (2013.01); *G05D 1/0297* (2013.01); *G06F 17/00* (2013.01); *G08G 1/096827* (2013.01); *G08G 1/096844* (2013.01); *H02J 7/35* (2013.01)

(58) Field of Classification Search
CPC ............... G08G 1/0969; G08G 1/0962; G08G 1/09626; G08G 5/0039; G08G 5/003; G08G 5/0056; G08G 5/0091; G08G 5/025; G08G 5/0078; G08G 5/0021; H04L 67/12; G05D 1/0297; G05D 1/0223; G05D 1/0274; G05D 1/0022; G05D 1/0088; G05D 1/0246; G06Q 10/0834; B61L 27/0077; G01S 15/74; G01S 15/876; G01S 15/878; G01S 5/30; G01S 3/808; G01S 19/14; G01S 19/13; B60T 7/18; B60W 20/12; B60W 20/13; B60W 2552/15; B60W 2520/10; B64D 45/00; G07C 5/0808; G07C 5/0833; G07C 5/0825

See application file for complete search history.

(56) References Cited

U.S. PATENT DOCUMENTS

| | | | |
|---|---|---|---|
| 10,467,913 B1* | 11/2019 | Suiter | G08G 5/0021 |
| 2005/0131631 A1* | 6/2005 | Nakano | G08G 1/096827 |
| | | | 701/532 |
| 2011/0202221 A1* | 8/2011 | Sobue | B60L 15/2045 |
| | | | 701/22 |
| 2013/0024060 A1* | 1/2013 | Sukkarie | G01C 21/26 |
| | | | 701/22 |
| 2013/0079964 A1* | 3/2013 | Sukkarie | G01C 21/3697 |
| | | | 701/22 |
| 2016/0009304 A1* | 1/2016 | Kumar | B61L 27/0077 |
| | | | 701/19 |
| 2016/0328968 A1* | 11/2016 | Elsheemy | B60T 7/18 |
| 2017/0343637 A1* | 11/2017 | Przybyla | G01S 15/74 |

FOREIGN PATENT DOCUMENTS

| | | |
|---|---|---|
| KR | 10-0906911 | 7/2009 |
| KR | 10-2014-0026068 | 3/2014 |

* cited by examiner

ROUTE 1

PLEASE ENTER DEPARTURE
PLACE AND PUSH DEPARTURE
BUTTON ON DEPARTURE.

PLEASE ENTER ARRIVAL
BUTTON ON ARRIVAL AND
ENTER DESTINATION.

VEHICLE AND METHOD FOR CONTROLLING THE VEHICLE

CROSS-REFERENCE TO RELATED APPLICATION(S)

This application claims the benefit of priority to Korean Patent Application No. 10-2017-0114561, filed on Sep. 7, 2017 with the Korean Intellectual Property Office, the entire disclosure of which is incorporated herein by reference.

TECHNICAL FIELD

Embodiments of the present disclosure relate to a vehicle capable of improving the fuel efficiency thereof and a method for controlling the same.

BACKGROUND

A vehicle is a driving apparatus configured to move on the road by driving vehicle wheels.

The vehicle includes internal combustion engine vehicles that burn petroleum fuel, e.g., gasoline and diesel to generate a mechanical power so as to drive using the mechanical power, and environment-friendly vehicles that drive using electricity to reduce fuel consumption and hazardous gas emission.

The environment-friendly vehicles include electric vehicles provided with a battery charged by an electric power source and a motor to rotate the wheels using the electricity stored in the battery and to drive vehicle wheels by using the rotation of the motor, and hybrid vehicles and hydrogen fuel cell electric vehicles provided with an engine, a battery and a motor to drive the wheels by controlling the mechanical power of the engine and the electrical power of the motor.

The hybrid vehicle can drive in the electric vehicle (EV) mode of using the power of the motor, or in the hybrid electric vehicle (HEV) mode of using the power of the engine and the motor. In addition, the hybrid vehicle performs regenerative braking, in which the battery is charged by recovering braking energy and the inertial energy through generation operations of the motor when braking or when coasting by the inertia.

As for the battery of the hybrid vehicles, the state of charge (SOC) of the battery is variably controlled by the engine operation according to the driving state. However, the engine operation is flexible and thus it is difficult to immediately apply the driving state to the state of charge (SOC) control. Accordingly, there may be difficulties in controlling the state of charge (SOC) of the vehicle's battery.

The difficulty in the state of charge (SOC) control may be generated because the control of the battery is not flexible in urban area, where congestion and traffic signal stop sections induce low efficiency, unlike in the medium and high speed sections having high charging efficiency, and in the ultra-high speed section having the low charging efficiency.

Accordingly, as for the battery of the hybrid vehicle, due to the idle charge, the entrance of the full load, and the frequent exiting of the state of charge (SOC) normal areas may occur, and thus the fuel efficiency of the engine may be reduced.

SUMMARY

Therefore, it is an aspect of the present disclosure to provide a vehicle, during a route driving mode, capable of acquiring road condition information related to a predetermined route and controlling driving of an engine based on the acquired road condition information, and a method for controlling the same.

It is another aspect of the present disclosure to provide a vehicle, during a route addition mode, capable of acquiring road condition information related to a route from a departure time to an arrival time, and acquiring and storing a driving load level for each period corresponding to the acquired road condition information for each period, and a method for controlling the same.

It is another aspect of the present disclosure to provide a vehicle, during a route driving mode and a route learning mode, capable of determining whether the vehicle deviates from the route based on a cumulative distance deviation for each period and an average speed deviation for each period, and performing a general driving mode by releasing the mode, which is currently performed, according to the result of the determination, and a method for controlling the same.

Additional aspects of the present disclosure will be set forth in part in the description which follows and, in part, will be obvious from the description, or may be learned by practice of the present disclosure.

In accordance with one aspect of the present disclosure, a vehicle includes an engine configured to apply a driving force to a vehicle wheel; a speed detector configured to detect a driving speed; a slope detector configured to detect a slope of a road; an input configured to receive a departure command and an arrival command; and a controller, when a route addition mode is selected, configured to acquire and store road condition information of a route between a departure time and an arrival time, based on a driving speed and a slope of the road, which is detected from when the departure time in which the departure command is received until the arrival time in which the arrival command is received, and the controller, when a route driving mode is selected, configured to control driving of the engine based on the stored road condition information of the road.

When the route driving mode is selected, the controller checks the number of times of route learning of the route, and when the checked number of times of route learning is equal to or less than a predetermined number of times, the controller performs the route learning mode, and when the checked number of times of route learning exceeds the predetermined number of times, the controller performs the route driving mode.

When the route addition mode is selected, the controller chronologically stores the driving speed and the slope between the departure time and the arrival time, acquires a speed level for each period based on the driving speed which is chronologically stored, acquires a slope level for each period based on the slope which is chronologically stored, acquires and stores a driving load level for each period based on the speed level for each period and the slope level for each period, and acquires and stores a cumulative distance for each period and an average speed for each period based on the driving speed which is chronologically stored.

When the route learning mode is selected, the controller chronologically stores the driving speed and the slope of the road detected during driving, acquires a driving load level based on the driving speed and the slope of the road which is chronologically stored, and updates the stored driving load level, based on the acquired driving load level.

When the route learning mode is selected, during driving, the controller acquires a cumulative distance for each period and an average speed for each period, based on the driving speed which is chronologically stored, and updates the cumulative distance and the average speed, which is stored in a storage, based on the acquired cumulative distance and average speed.

When performing the route learning mode, the controller determines whether the vehicle deviates from the route based on the acquired cumulative distance for each period and the stored cumulative distance for each period, and when it is determined that the vehicle deviates from the route, the controller terminates the route learning mode.

When performing the route learning mode, the controller determines whether the vehicle deviates from the route based on the acquired average speed for each period and the stored average speed for each period, and when it is determined that the vehicle deviates from the route, the controller terminates the route learning mode.

When performing the route learning mode, the controller determines whether the vehicle deviates from the route based on at least one of the acquired cumulative distance and average speed for each period and the stored cumulative distance and average speed for each period, and when it is determined that the vehicle deviates from the route, the controller terminates the route learning mode.

The vehicle may further include a motor; a battery configured to supply the power to the motor; a battery manger configured to manage a state of charge of the battery; and a storage configured to store a map matched with a feedback compensation factor in which a difference in a charge amount corresponds to the driving load level. The controller sets a target state of charge based on the stored driving load level for each period, acquires the difference in the charge amount by comparing the set target state of charge with a state of charge of the battery of the battery manger, checks a feedback compensation factor corresponding to the acquired difference in the charge amount and the stored driving load level for each period, from the storage, and compensates driving information of the engine based on the checked feedback compensation factor.

When performing the route driving mode, the controller acquires the cumulative distance and average speed for each period based on the detected driving speed, determines whether the vehicle deviates from the route based on at least one of the acquired cumulative distance and average speed for each period and the stored cumulative distance and average speed for each period, and when it is determined that the vehicle deviates from the route, the controller terminates the route driving mode and performs a general driving mode.

The vehicle may further include a display configured to display guide information about adding a route, when the route addition mode is selected.

In accordance with another aspect of the present disclosure, a vehicle includes a storage configured to store at least one route, and reference road condition information about the at least one route; a speed detector configured to detect a driving speed; a slope detector configured to detect a slope of a road; and a controller configured to learn road condition information related to the at least one route, based on a driving speed and a slope of the road which is detected during driving on the at least one route, and configured to update the road condition information, based on the learning information.

The reference road condition information comprises a reference average speed for each, a reference cumulative distance for each period, and a reference driving load level for each period. When a route learning mode is selected, the controller chronologically stores a driving speed and a slope of the road which is detected during driving, acquires a driving load level based on the driving speed and the slope of the road which is chronologically stored, updates the stored reference driving load level, based on the acquired driving load level, acquires a cumulative distance and an average speed for each period based on the driving speed which is chronologically stored, and updates the reference cumulative distance and the reference average speed for each period, based on the acquired cumulative distance and average speed for each period.

When performing the route learning mode, the controller determines whether the vehicle deviates from the route based on at least one of the acquired cumulative distance and average speed for each period and the stored cumulative distance and average speed for each period, and when it is determined that the vehicle deviates from the route, the controller terminates the route learning mode.

In accordance with another aspect of the present disclosure, a method for controlling a vehicle provided with a motor configured to apply a driving force to a vehicle wheel, a battery configured to supply the power to the motor, and an engine configured to apply a driving force to the vehicle wheel, the method includes: when a route addition mode is selected, storing chronologically a driving speed and a slope of the road, which is detected from when a departure time in which a departure command is received until an arrival time in which an arrival command is received; acquiring a speed level for each period based on the speed which is chronologically stored; acquiring a slope level for each period based on the slope which is chronologically stored; acquiring a driving load level based on the speed level for each period and the slope level for each period; storing the acquired driving load level as reference road condition information; and when a route driving mode is selected, controlling driving the engine and the motor based on the stored reference road condition information and controlling charging of the battery.

The control method may further include checking the number of times of route learning of the route when the route driving mode is selected; performing the route learning mode when the checked number of times of route learning is equal to or less than a predetermined number of times; and performing the route driving mode when the checked number of times of route learning exceeds the predetermined number of times.

The control method may further include, when a route learning mode is selected, storing chronologically a driving speed and a slope of the road which is detected during driving; acquiring a driving load level based on the driving speed and the slope of the road which is chronologically stored; and updating the stored driving load level, based on the acquired driving load level.

The storage of the reference road condition information comprises acquiring and storing a reference cumulative distance and a reference average speed for each period, based on the driving speed which is chronologically stored.

The control method may further include, when the route learning mode is selected, acquiring a cumulative distance for each period and an average speed for each period, based on the speed which is detected during driving; and updating the reference cumulative distance for each period and the reference average speed for each period, which are stored in a storage, based on the acquired cumulative distance for each period and average speed for each period.

The control method may further include, when performing the route learning mode, determining whether the vehicle deviates from the route based on at least one of the acquired cumulative distance and average speed for each period and the stored cumulative distance and average speed for each period; and terminating the route learning mode, when it is determined that the vehicle deviates from the route.

The control method may further include when performing the route driving mode, acquiring the cumulative distance and average speed based on the detected driving speed; determining whether the vehicle deviates from the route based on at least one of the acquired cumulative distance for each period and the average speed and the reference cumulative distance for each period and the reference average speed for each period; and when it is determined that the vehicle deviates from the route, terminating the route driving mode and performing a general driving mode.

The determination of whether the vehicle deviates from the route comprises checking a current period; calculating a cumulative distance deviation value between a cumulative distance until the current period and the reference cumulative distance until a period corresponding to the current period; calculating an average speed deviation value between the average speed for each period until the current period and the reference average speed for each period, when the calculated cumulative distance deviation value is equal to or greater than a first threshold value; checking the number of period in which the average speed deviation value exceeds a second threshold value; and determining that the vehicle deviates from the route, when the number of period exceeds a third threshold value.

The control method may further include, setting a target state of charge based on the stored reference driving load level for each period; acquiring the difference in the charge amount by comparing the set target state of charge with a state of charge of the battery of the battery manger; checking a feedback compensation factor corresponding to the acquired difference in the charge amount and the reference driving load level for each period, from a pre-stored map; and compensating driving information of the engine based on the checked feedback compensation factor.

BRIEF DESCRIPTION OF THE DRAWINGS

These and/or other aspects of the disclosure will become apparent and more readily appreciated from the following description of embodiments, taken in conjunction with the accompanying drawings of which:

FIG. 8 is a view illustrating an example of a guidance information display when a vehicle is added to a route in accordance with exemplary embodiments of the present disclosure.

DETAILED DESCRIPTION

The present disclosure will be described more fully hereinafter with reference to the accompanying drawings, in which exemplary embodiments of the disclosure are shown.

Figure 1:
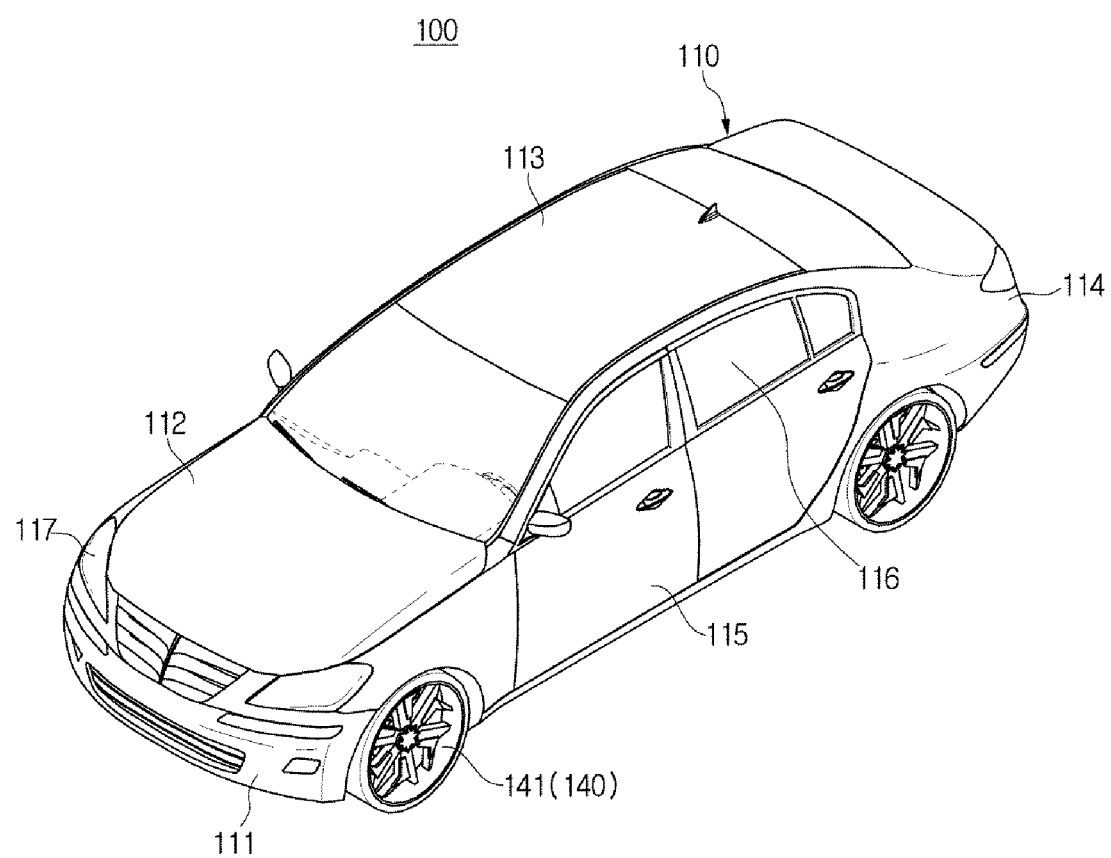
FIG. 1 is an exemplary view illustrating an exterior of a body of a vehicle in accordance with exemplary embodiments of the present disclosure.
Figure 2:
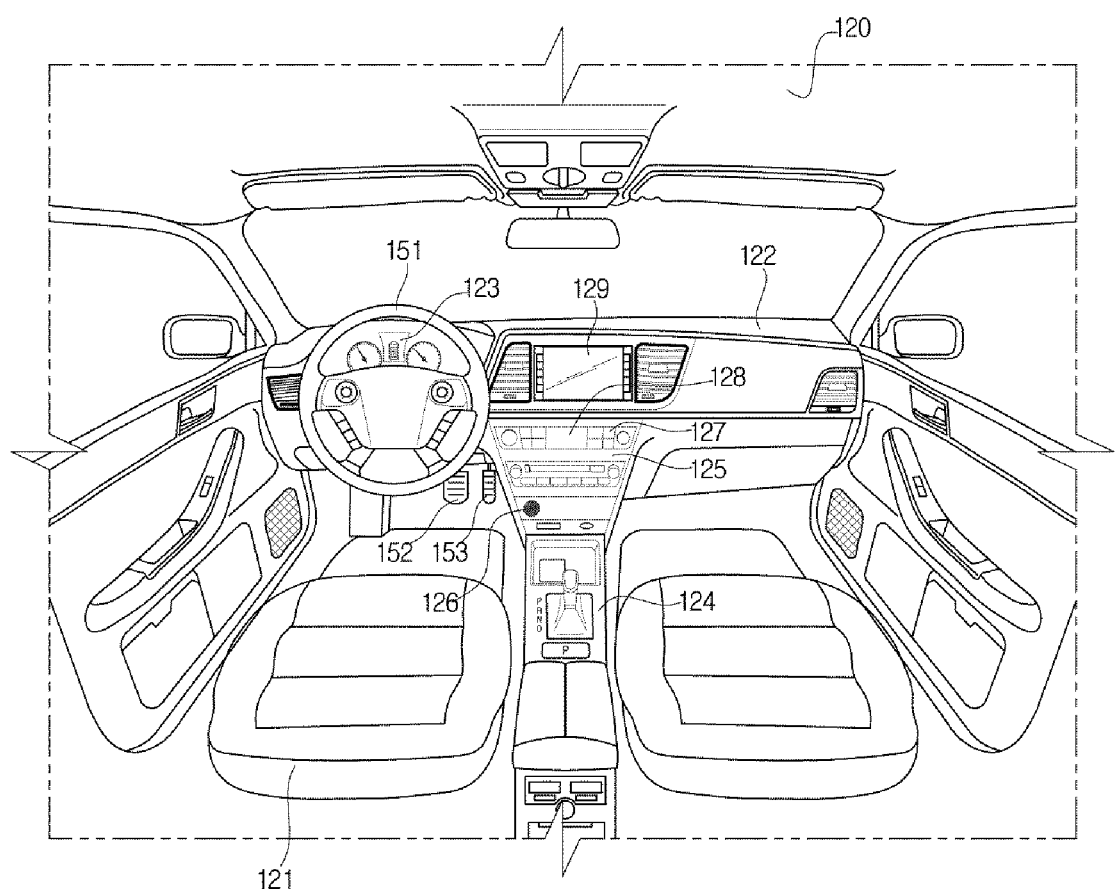
FIG. 2 is an exemplary view illustrating an interior of the body of a vehicle in accordance with exemplary embodiments of the present disclosure.
Figure 3:
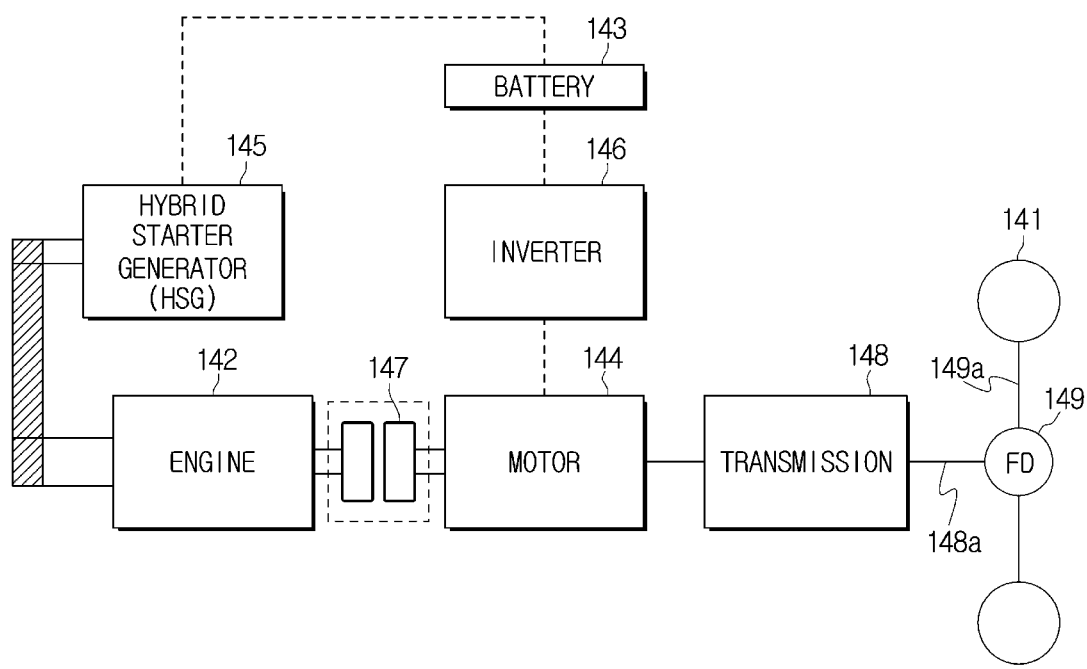
FIG. 3 is a view illustrating a chassis, or drive train, of a vehicle in accordance with exemplary embodiments of the present disclosure.

FIG. 1 is an exemplary view illustrating an exterior of a body of a vehicle in accordance with an embodiment of the present disclosure, FIG. 2 is an exemplary view illustrating an interior of the body of the vehicle in accordance with an embodiment of the present disclosure and FIG. 3 is a view illustrating a chassis of the vehicle in accordance with an embodiment of the present disclosure.

According to an embodiment, a vehicle 100 may be a hybrid vehicle that is provided with an engine, a battery and a motor so as to drive by controlling the mechanical power of the engine and the electric power of the motor, wherein the hybrid vehicle may be a hybrid electric vehicle (HEV) or a plugin hybrid electric vehicle (PHEV).

The vehicle 100 may include a body a having an interior 110 and an exterior 120, and a chassis 140, which is the rest of the vehicle aside from the body, and in which a mechanical apparatus is installed for the driving.

As illustrated in FIG. 1, an exterior 110 of the body may include a front panel 111, a bonnet 112, a roof panel 113, a rear panel 114, a front, rear, left, and right door 115, and a window glass 116 provided in the front, rear, left, and right door 115 to be openable.

The exterior of the body may further include a pillar provided in the boundary between window glasses of the front, rear, left, and right door, a side mirror providing a view of the rear side of the vehicle 100 to a driver, and a lamp 117 allowing the driver to easily check the surroundings while focusing on the front, sending a signal to other vehicle and a pedestrian, and performing communication function with other vehicle and a pedestrian.

As illustrated in FIG. 2, the interior 120 of the body may include a seat 121 on which a passenger is seated, a dashboard 122, an instrument panel that is a cluster, 123, a center fascia 124 in which an operation panel and an outlet of the air conditioning device are installed, a head device 125 provided in the center fascia 124 and configured to receive an operation command of the audio device and the air conditioning device, and an ignition device 126 provided in the center fascia 124 and configured to receive an ignition command, wherein the instrument panel may be disposed on the dashboard and may include tachometer, speedometer, coolant temperature indicator, fuel indicator, turn signal indicator, high beam indicator light, warning lights, seat belt warning light, trip odometer, odometer, automatic transmission selector lever indicator, door open warning light, oil warning light and a low fuel warning light.

The vehicle 100 may further includes a shift lever provided in the center fascia 124 to receive an input of the operation position and a parking button (electronic parking brake (EPB) button) provided around the shift lever or in the head device 125 to receive an input of an operation command of an electric parking braking device (not shown).

The vehicle 100 may further include an input 127 configured to receive an operation command of a variety of functions.

The input 127 may be disposed on the head device 125 and the center fascia 124, and may include at least one physical button such as On/Off button for the variety of functions, and a button to change a set value of the variety of functions.

The input 127 may further include a jog dial (not shown) or a touch pad (not shown) to input a command for moving cursor and selecting cursor, wherein the cursor is displayed on a display of the user interface 129.

The jog dial or the touch pad may be provided in the center fascia.

The vehicle 100 may further include a display 128 provided in the head device 125 and configured to display information related to a function that is currently performed in the vehicle and information input from a user.

The display 128 may display any one of an electric vehicle mode (i.e., EV mode) or a hybrid electric vehicle mode (i.e., HEV mode) that is a current driving mode of the vehicle.

The vehicle may further include the user interface 129 for the user's convenience.

The user interface 129 may display information related to the function that is currently performed and information that is input by a user.

When the user interface 129 is implemented by a touch screen in which a touch panel and a display panel are integrally formed with each other, the input function and the display function may be performed. Alternatively, when the user interface 129 is provided with only display panel, the display function may be performed.

The chassis 140 of the vehicle is a frame supporting the body 110 and 120. In the chassis 140, a vehicle wheel 141 disposed in the front, rear and left and right side, a power system 142-149 generating the torque of the vehicle, regulating the generated torque, and applying the regulated torque to the front, rear, left and right vehicle wheel 141, a steering system, a brake system and a suspension system applying the brake force to the front, rear, left and right vehicle wheel 141 may be provided.

The vehicle 100 may include a steering wheel 151 of the steering system for adjusting the direction of drive, a brake pedal 152 that is pressed by a user in accordance with the braking will of the user, and an accelerator pedal 153 that is pressed by a user in accordance with the acceleration will of the user (refer to FIG. 2).

As illustrated in FIG. 3, the power system may include an engine 142, a fuel system (not shown), a cooling device (not shown), a fuel supply device (not shown), a battery 143, a motor 144, a generator 145, an inverter 146, a clutch 147, a transmission 148, a final reduction gear and a differential gear 149. In addition, the power system may further include an actuator 147a driving the clutch 147.

The engine 142 generates the mechanical power by burning of petroleum fuels such as gasoline and diesel, and delivers the generated power to the clutch 147.

The battery 143 generates the electric power having the high voltage current and supplies the generated electric power to the motor 144, the generator 145 and a variety of electronic in the vehicle.

The battery 143 is charged by receiving the electric power from the generator 145.

The battery 143 may be managed by a battery manager 167. The battery manager 167 will be described later.

The motor 144 may generate a torque by using the electric energy of the battery 143 and transmit the generated torque to the vehicle wheel, thereby driving the vehicle wheel.

When the motor 144 is connected to the engine 142 through the clutch 147, the motor 144 may also transmit the torque of the engine 142 to the vehicle wheel. The motor 144 may perform the conventional torque converter while absorbing the impact when the clutch is closed.

The motor 144 may convert the electric energy of the battery 143 into a mechanical energy to operate a variety of electronics provided in the vehicle.

The motor 144 may be operated as a generator in a regenerative braking condition by the braking, when reducing speed, or when driving at a lower speed, so that the battery 143 is charged.

The generator 145 (hereinafter referred to as Hybrid Starter Generator (HSG)) corresponds to a start generator. Since the hybrid starter generator (HSG) 145 is connected to a crankshaft of the engine 142, the hybrid starter generator (HSG) 145 may be interlocked with the crankshaft of the engine 142 and operated as a start motor when the engine 142 is started. When the vehicle wheel is not driven by the engine 142, the hybrid starter generator (HSG) 145 may be operated as a generator by the engine 142 so as to allow the battery 143 to be charged.

That is, the hybrid starter generator (HSG) 145 may be operated as a generator by the power transmitted from the engine 142 so that the battery 143 is charged.

The vehicle may be supplied with the electric power from a charger disposed in a parking lot or a charging station, and thus the vehicle may charge the battery 143 by using the supplied electric power.

The power system of the vehicle may further include a power converter (not shown) converting the electric power generated by the hybrid starter generator (HSG) 145 to an electric power capable of charging the battery 143, and converting the electric power of the battery 143 into the driving power of the hybrid starter generator (HSG) 145. The power converter may include a converter.

The power converter may change the direction and the output of the current between the hybrid starter generator (HSG) 145 and the battery 143.

The inverter 146 converts the electric power of the battery 143 into the driving power of the motor 144.

When outputting the driving power of the motor 144, the inverter 146 may output the driving power of the motor 144 based on a target vehicle speed according to user's command. The driving power of the motor 144 may be a switching signal for outputting the current corresponding to the target vehicle speed and a switching signal for outputting the voltage corresponding to the target vehicle speed.

In other words, the inverter 146 may include a plurality of switching elements.

The clutch 147 may be disposed between the engine 142 and the motor 144.

The clutch 147 may be closed or locked when generating the driving force of the vehicle wheel by using the engine 142 and the motor 144. When generating the driving force of the vehicle wheel by using the motor 144, the clutch 147 may be opened because a spring (not shown) is pushed by the hydraulic pressure generated by a Hydraulic Clutch Actuator (HCA).

That is, the clutch 147 may be selectively in an open state and a closed state according to the driving mode of the vehicle.

Particularly, the clutch 147 may be opened during the deceleration driving and the low speed driving by using the motor 144, and the clutch 147 may be opened during the braking. The clutch 147 may be closed during a climbing driving, an acceleration driving, and a constant speed driving that is faster than a predetermined speed, and during a battery protection mode.

The clutch 147 may be a normal close clutch that allows the engine 142 to be connected to the motor 144 when the power of the vehicle is turned off.

The transmission 148 may transmit the torque of the engine 142 and the motor 144 to the vehicle wheel 141 or transmit the torque of the motor 144 to the vehicle wheel 141.

The transmission 148 may be a dual clutch transmission (DCT) configured to allow a gear to be operated by using two clutches.

The transmission 148 may perform an optimal torque conversion by allowing the gear to be operated automatically, based on the driving speed of the vehicle.

The vehicle may further include a final reduction and differential gear (FD) 149 provided between the transmission 148 and the vehicle wheel 141.

The final reduction and differential gear (FD) 149 may include a final reduction gear and a differential gear.

The final reduction gear converts revolution per minute (RPM), or output, of the motor to allow the driving speed of the vehicle to reach a target speed. That is, the final reduction gear generates the driving force corresponding to the converted RPM of the motor and transmits the generated driving force to the left and right vehicle wheel 141.

The final reduction gear may convert the input RPM of the motor to a certain rate.

The target speed may be a speed corresponding to a pressure of an accelerator pedal 153 or a brake pedal 152.

The final reduction gear may include a drive pinion and a ring gear, and reduce the rotational speed and convert the rotation direction to the right angle. That is, the final reduction gear reduces the speed between the transmission 148 and the vehicle wheel 141, again so as to increase the driving force while changing the direction of the power transmission.

The final reduction gear receives the torque of a propeller shaft 148a by using the drive pinion and coverts the direction into an angle that is similar the right angle while reducing the torque, and transmits the torque to the differential gear. The final reduction gear transmits the changed torque of the propeller shaft to the rear axle and increases the torque through the final reduction.

The differential gear rotates the left and right vehicle wheel at a different speed.

That is, the differential gear adjusts the gear ratio of the transmission 148 and generates the driving force of the left and right vehicle wheel and transmits the generated driving force to the left and right vehicle wheel.

According to exemplary embodiments, the power system has a parallel structure such that the engine 142 and the motor 144 are connected to the axle 149a of the vehicle so that the engine 142 and the motor 144 simultaneously drive the vehicle.

When the vehicle drives by using the motor 144 (EV mode), the vehicle may open the clutch 147 so that the motor 144 and the engine 142 are not mechanically connected so as to directly transmit the rotation of the motor 144 to the transmission 148. In this time, the engine 142 may be in a turning-off mode and when charging the battery, the engine 142 may be in a turning-on mode.

When the vehicle drives by using the engine 142 and the motor 144 (HEV mode), the vehicle may close the clutch 147 so that the torque of the engine 142 is added to the torque of the motor 144 and then transmitted to the transmission 148.

When the vehicle drives by using the engine 142, the vehicle may close the clutch 147 to be rotated with the motor 144 to connect the engine 142 to the axle the engine 142.

Figure 4:
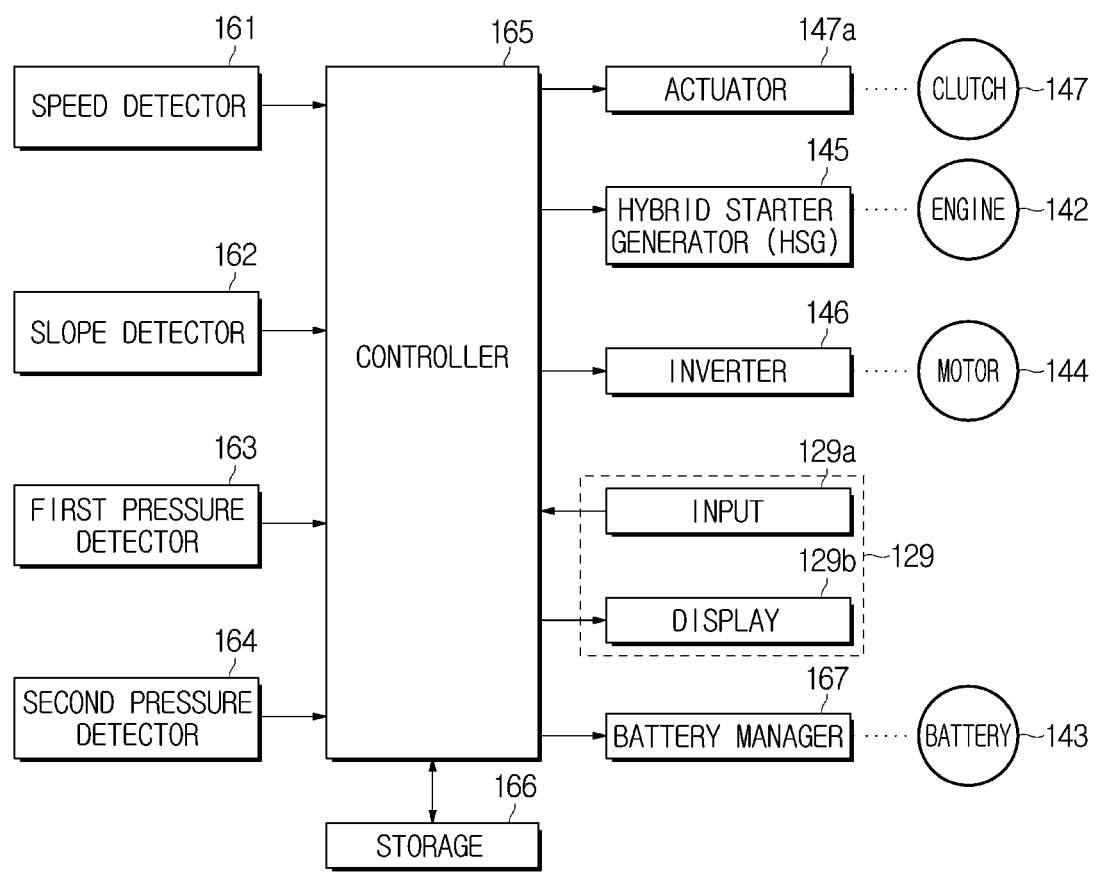
FIG. 4 is a control block diagram illustrating a control of a vehicle in accordance with exemplary embodiments of the present disclosure.
Figure 5:
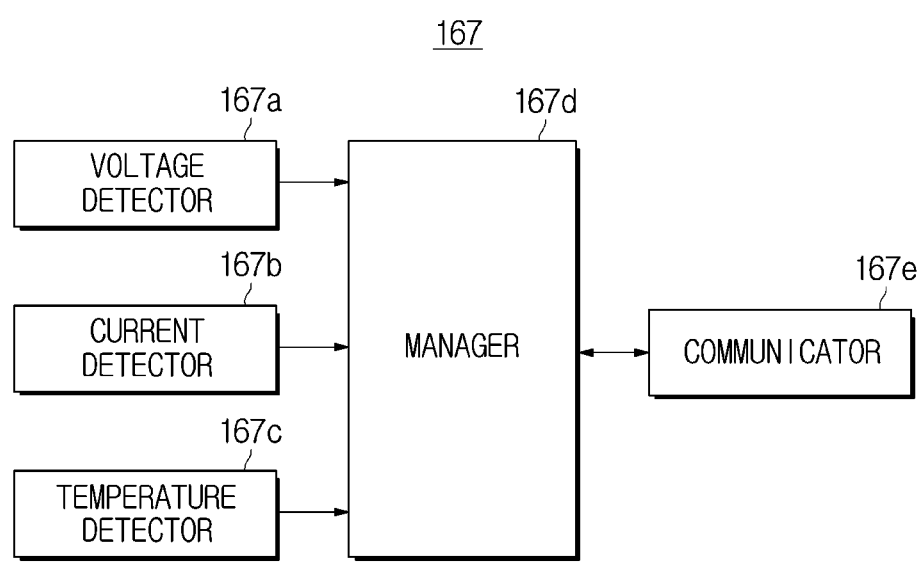
FIG. 5 is a control block diagram illustrating a battery manager 167 of FIG. 4.

FIG. 4 is a control block diagram illustrating the control of the vehicle in accordance with an embodiment, and FIG. 5 is a control block diagram illustrating the battery manager 167 of FIG. 4.

As illustrated in FIG. 4, the vehicle 100 may include the user interface 129, a speed detector 161, a slope detector 162, a first pressure detector 163, a second pressure detector 164, a controller 165, a storage 166 and the battery manager 167.

The user interface 129 receives operation information from a user and displays information related to a mode that is currently performed in the vehicle.

The user interface 129 may include an input 129a and a display 129b.

The input 129a receives an operation command of an eco-mode, a route addition mode, a route learning mode, and a route driving mode and receive a departure command and an arrival command.

The input 129a may receive a name of departure point and a name of destination.

The input receiving the variety of information may be an input provided in the head device 125 and an input provided in the center fascia.

The display 129b may display the eco-mode, the route addition mode, the route learning mode, the route driving mode and a general driving mode, and display guide information related to a mode that is currently performed.

When in the route learning mode and the route driving mode, the display 129b may display a name of route, and information related to the deviation from the route The display 129b may display the hybrid electric vehicle (HEV) mode using only the power of the motor 144 and the electric vehicle (EV) mode using the power of the engine 142 and the power of the motor 144.

The display 129b may display information related to the state of charge of the battery.

The display displaying a variety of information may be a display provided in the head device 125 and a display (not shown) provided in the cluster 123.

The display may be a lamp corresponding to a light emitting diode (LED) additionally provided in the interior of the vehicle.

The speed detector 161 detects the driving speed of the vehicle.

The speed detector 161 may include a wheel speed sensor configured to detect a rotational speed provided in each of the front, rear, left and right vehicle wheel, and an acceleration detector configured to detect the acceleration of the vehicle.

The slope detector 162 detects a slope of the road.

The slope detector 162 may include at least one of an acceleration sensor, a gyro sensor, an angular velocity sensor and a gravity sensor.

A first pressure detector 163 detects a pressure applied to the accelerator pedal 153.

A second pressure detector 164 detects a pressure applied to the brake pedal 152.

The vehicle may further include a RPM detector (not shown) for detecting the RPM of the engine.

The controller 165 acquires information related to the pressure of the accelerator pedal 153 or the brake pedal 152 when the accelerator pedal 153 or the brake pedal 152 is pressed by a user, acquires a user needs power based on the acquired pressure information and the speed information, which is detected by the speed detector 161, acquires a target driving speed of the vehicle corresponding to the acquired user needs power, and controls at least one operation of the engine 142 and the motor 144 based on the acquired target driving speed of the vehicle.

Accordingly, it may be possible to drive the vehicle by the power generated by at least one of the engine 142 and the motor 144.

Based on the target driving speed of the vehicle, whether to perform the acceleration driving, and whether to perform the climbing driving, the controller 165 may allow the vehicle to drive in the EV mode by using the power of the motor 144 or to drive in the HEV mode by using the power of the motor 144 and the engine 142.

The controller 165 may control the close of the clutch 147 by controlling the operation of a motor (not shown) in the actuator 147*a*, and control the hydraulic pressure supplied to the clutch 147 so that the clutch 147 is opened or closed. Accordingly, the controller 165 may allow the vehicle to drive in the EV mode or HEV mode.

Hereinafter a configuration of the controller in a state in which the clutch is a normal close type clutch will be described.

When the vehicle is in the EV mode, the controller 165 may allow the clutch 147 to be opened and control the rotational speed of the motor 144 based on the target driving speed.

The controller 165 may control switching of the inverter 146 when controlling the rotational speed of the motor 144.

When the vehicle is in the HEV mode, the controller 165 may allow the clutch 147 to be closed and control the rotational speed of the engine 142 and the motor 144 based on the target driving speed.

When the vehicle is in the HEV mode, the controller 165 may control the operation of the hybrid starter generator (HSG) 145 to allow the engine 142 to be started and to control the driving of the engine.

When the vehicle is in the HEV mode, the controller 165 may perform the communication with the battery manager 167 and receive information related to a state of charge (SOC) of the battery from the battery manager 167.

The SOC of the battery may include a charge amount of the battery.

When receiving a command to select the eco-mode through the input 129*a* of the user interface, the controller 165 may allow the display 129*b* of the user interface to display the selection mode, and when receiving a command to select the route addition mode through the input 129*a* of the user interface, the controller 165 may allow guide information related to adding a route to be output.

When receiving a departure command, the controller 165 may receive speed information of the vehicle detected by the speed detector 161 and slope information of the road detected by the slope detector 162 until the controller 165 receives an arrival command, and store the received speed information and slope information in chronological order.

The controller 165 may divide the speed information, which is chronologically stored from a departure time in which the departure command is received until an arrival time in which the arrival command is received, at a predetermined period of time and calculate an average speed based the speed information, which is divided at the predetermined period of time.

That is, the controller 165 may set the predetermined period of time as a single period, calculate the average speed for each period and store the calculated average speed for each period.

The controller 165 may calculate a cumulative distance at a predetermined period of time based on the speed information, which is divided at the predetermined period of time. That is, the controller 165 may calculate a cumulative distance for each period and store the calculated cumulative distance for each period.

The controller 165 may acquire a speed level corresponding to the average speed for each period.

The controller 165 may divide the slope information, which is chronologically stored, at a predetermined period of time, set the predetermined period of time as a single period and acquire the slope level corresponding to the acquired slope for each period.

The controller 165 may acquire a driving load level for each period based on the speed level for each period and the slope level for each period, and store the acquired driving load level for each period.

When receiving a command to select the driving learning mode, the controller 165 may allow a route stored in the storage 166 to be displayed and when any route is selected via the input and the departure command is received, the controller 165 may perform a route learning until the arrival command is received. The controller 165 may determine whether the vehicle deviates from the route during the route learning, and when it is determined that the vehicle deviates from the route, the controller 165 may terminate the route learning.

When performing the route learning mode, the controller 165 may acquire the average speed for each period, the cumulative distance for each period, and the driving load level for each period based on the speed information of the vehicle detected by the speed detector 161 and the slope information of the road detected by the slope detector 162. When the route learning mode is completed, the controller 165 may calculate an average value between the acquired average speed for each period, the acquired cumulative distance for each period, and the acquired driving load level for each period, and a reference average speed for each period, a reference cumulative distance for each period, and a reference driving load level for each period, which are stored in the storage, respectively, and update road condition information of the route stored in the storage based on the calculated average value.

In other words, the controller 165 may calculate an average speed between the current average speed for each period and the reference average speed for each period, and change the reference average speed stored in the storage, into the calculated average speed. The controller 165 may calculate an average cumulative distance between the current cumulative distance for each period and the reference cumulative distance for each period and change the reference cumulative distance stored in the storage, into the calculated cumulative distance. The controller 165 may calculate an average level between the current driving load level for each period and the reference driving load level for each period and change the reference driving load level stored in the storage into the calculated driving load level.

When performing the route learning mode, the controller 165 may check the current period during the vehicle drives, check the reference cumulative distance in a period corresponding to the checked current period, and compare the current cumulative distance with the reference cumulative distance. When a cumulative distance deviation value between the current cumulative distance and the reference cumulative distance exceeds a first threshold, the controller 165 may determine that the vehicle deviates from the route.

When performing the route learning mode, the controller 165 may check the current period during the vehicle drives, check the reference average speed for each period until the period corresponding to the current period, among the reference average speed for each period stored in the storage, and compare the current average speed for each period with the reference average speed for each period. When an average speed deviation value between the current average speed for each period and the reference average speed exceeds a second threshold, the controller 165 may check the period, and when the checked number of periods exceeds a third threshold, the controller 165 may determine that the vehicle deviates from the route.

During performing the route learning mode, when it is determined that the cumulative distance deviation value between the current cumulative distance and the reference cumulative distance exceeds the first threshold and it is determined that the number of period in which the average speed deviation value between the current average speed and the reference average speed exceeds the second threshold, exceeds the third threshold, the controller 165 may determine that the vehicle deviates from the route.

In an embodiment, an example of using an average speed of speeds detected during the predetermined period of time has been described. Alternatively, it may be possible to divide the speed information, which is stored chronologically, at a predetermined period of time, and to use the maximum speed or minimum speed in the speed in the predetermined period of time.

When receiving a command to select the route driving mode, the controller 165 may allow a route stored in the storage 166 to be displayed and when any one route is selected through the input 129a, the controller 165 may perform the route driving mode until the arrival command is received. During the controller 165 performing the route driving mode, the controller 165 may determine whether the vehicle deviates from the route, and when it is determined that the vehicle deviates from the route, the controller 165 may terminate the route driving mode and perform the general driving mode.

When performing the route driving mode, the controller 165 may check the current period during the vehicle drives, acquire the cumulative distance and the average speed in the current period based the detected speed information, check the reference cumulative distance in a period corresponding to the current period, and compare the current cumulative distance with the reference cumulative distance. When a cumulative distance deviation value between the current cumulative distance and the reference cumulative distance exceeds the first threshold, the controller 165 may determine that the vehicle deviates from the route.

When performing the route driving mode, the controller 165 may check the reference average speed for each period until the period corresponding to the current period, and compare the current average speed for each period with the reference average speed. When an average speed deviation value between the current average speed and the reference average speed exceeds the second threshold, the controller 165 may check the period, and when the checked period number exceeds the third threshold, the controller 165 may determine that the vehicle deviates from the route.

During the controller 165 performing the route driving mode, when it is determined that the cumulative distance deviation value between the current cumulative distance and the reference cumulative distance exceeds the first threshold and it is determined that the number of periods, in which the average speed deviation value between the current average speed for each period and the reference average speed exceeds the second threshold, exceeds the third threshold, the controller 165 may determine that the vehicle deviates from the route.

In an embodiment, an example of using an average speed of speeds detected during a predetermined period of time has been described. Alternatively, it may be possible to divide the speed information, which is stored chronologically, at a predetermined period of time, and to use the maximum speed or minimum speed in the speed in the predetermined period of time.

When it is determined that the current route is the same as a predetermined route during the controller 165 performs the route driving mode, the controller 165 may check the speed detected by the speed detector, receive the state of charge of the battery from the battery manager 167, check a RPM of the engine detected by the RPM detector, and acquire a user needs power based on the current speed and the pressure detected by the first and second pressure detector.

The controller 165 may check information related to turning on and off of the engine corresponding to the current state of charge and the speed, from a first map stored in the storage, and check a target output torque of the engine corresponding to the user needs torque, or torque needs, and the RPM of the engine, from the first map stored in the storage.

When performing the route driving mode, the controller 165 may acquire the reference driving load level for each period from the storage 166, set a target state of charge based on the acquired reference driving load level for each period, and check a charge amount difference between the set target state of charge and the current state of charge.

The controller 165 may check a feedback compensation factor corresponding to the charge amount difference and the reference driving load level from a third map stored in the storage, compensate turning on and off of the engine and the target output torque of the engine based on the checked feedback compensation factor, and perform the feedback control the drive of the engine based on driving information of the engine, which is compensated.

In addition, when performing the general driving mode, the controller 165 may check information related to turning on and off of the engine corresponding to the current state of charge and the speed, from the first map stored in the storage, check the target output torque of the engine corresponding to the user needs torque and the RPM of the engine, from the first map stored in the storage, and perform the feedback control the drive of the engine based on the checked driving information of the engine.

When the route driving mode is input and any one route is selected, the controller 165 may check the number of times of route learning about the selected route, and when the number of times of the route learning is equal to or less than a predetermined number of times, the controller 165 may perform the route leaning mode or when the number of times of the route learning exceeds the predetermined number of times, the controller 165 may perform the route driving mode.

The controller 165 may perform the route driving mode while performing the route learning mode.

When the route learning mode is selected through the input, the controller 165 may perform the route learning about a route that is selected by a user, and when the route driving mode is selected through the input, the controller 165 may perform the route driving mode regardless of the number of times of the route learning.

When the clutch 147 is in a closed state, the engine 142 may transmit the generated power to the vehicle wheel 141 and the hybrid starter generator (HSG) 145.

The hybrid starter generator (HSG) 145 may start the engine based on the control command of the controller 165 or perform as a generator by the power of engine so as to charge the battery.

According to the control command of the 165, the inverter 146 may convert the direct current (DC) power, which is supplied from the battery, into three-phase alternating-current (AC) power and apply the AC power to the motor 144.

The hydraulic clutch actuator (HCA) 147a may deliver oil to the clutch by the drive of the motor (not shown) provided therein, so as to generate a hydraulic pressure in the clutch 147. A spring (not shown) in the clutch may be pushed by the hydraulic pressure generated in the clutch 147, so that the clutch 147 is opened.

The controller 165 may be implemented using a memory (not shown) storing an algorithm for controlling an operation of components in the vehicle and data related to programs implementing the algorithm, and a processor (not shown) performing the above mentioned operation using the data stored in the memory. The memory and the processor may be implemented in separate chips, or a single chip.

The controller 165 may include a first controller (i.e., engine control unit (ECU)) configured to control an operation of the hybrid starter generator (HSG) 145 and the engine 142, a second controller (i.e., motor control unit (MCU)) configured to allow the regenerative braking to be performed when braking and reducing the speed, and to rotate the motor 144 by controlling the operation of the inverter 146, based on a control signal of a main controller, a third controller (i.e., local control unit (LCU)) configured to allow the clutch 147 to be the opened or closed by controlling the operation of the hydraulic clutch actuator (HCA) 147a, and the main controller (i.e., HEV control unit (HCU)) configured to distribute a torque to the engine and the motor based on the target speed of the vehicle, and to output a control signal to the first, second and third controller based on the distributed torque.

The first, second and third controller and the main controller may be implemented by a separate chip or alternatively, the first, second and third controller and the main controller may be packaged and integrated, thereby being implemented by a single chip.

The controller 165 may be an electronic control unit (ECU) controlling the driving of the vehicle or the controller 165 may be any one of a microcomputer, a central processing unit (CPU) and a processor.

The storage 166 may store the first map matched with information, which is related to turning on and off of the engine corresponding to the state of charge of the battery and the driving speed of the vehicle.

The storage 166 may store the second map matched with the target output torque of the engine corresponding to the user needs torque and the RPM of the engine.

The storage 166 may store the third map matched with the feedback compensation factor corresponding to the charge amount difference and the driving load level. The feedback compensation factor may be a value between 0 (zero) and 1 (one).

The storage 166 may store reference road condition information about a predetermined route.

The road condition information may include the reference driving load level for each period, the reference average speed for each period and the reference cumulative distance for each period.

In addition, the road condition information may further include the speed level for each period and the slope level for each period.

The storage 166 may be a memory that is implemented by a chip separate from the above mentioned processor related to the controller 165, or the storage 166 may be implemented by a single chip with a processor.

The storage 166 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto.

As illustrated in FIG. 5, the battery manager 167 may include a voltage detector 167a, a current detector 167b, a temperature detector 167c, a manager 167d and a communicator 167e.

The voltage detector 167a may detect the voltage of the battery 143. The voltage detector 167a may detect the voltage of an output terminal of the battery 143.

The current detector 167b may detect the current of the battery 143.

The temperature detector 167c may detect the temperature of the battery 143.

The voltage detector 167a, the current detector 167b, and the temperature detector 167c may detect the voltage, the current and the temperature of each cell in the battery.

The manager 167d may acquire the charge amount of the battery based on the detected current and voltage of the battery, compensate the acquired charge amount of the battery based on the detected temperature of the battery, and output the compensated charge amount of the battery as the information related to the state of charge of the battery, to the controller 165.

The manager 167d may manage the state of charge (SOC) based on the current, the voltage and the temperature of each cell of the battery, and determine the target state of charge based on the state of charge of the battery and the temperature of the battery, thereby allowing the output of the motor to be variable.

In addition, the manager 167d may prevent the battery from shorting the life of the battery caused by the overcharge and the over-discharge of the battery.

The communicator 167e may communicate with the controller 165 and transmit the information related to the state of charge of the battery to the controller 165.

The communicator 167e may include one or more components configured to allow the communication with an external device, wherein the communicator may include at least one of a short range communication module, a wired communication module and a wireless communication module.

The short-range communication module may include a variety of short range communication modules, which are configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA) and Long Term Evolution (LTE).

Figure 6:
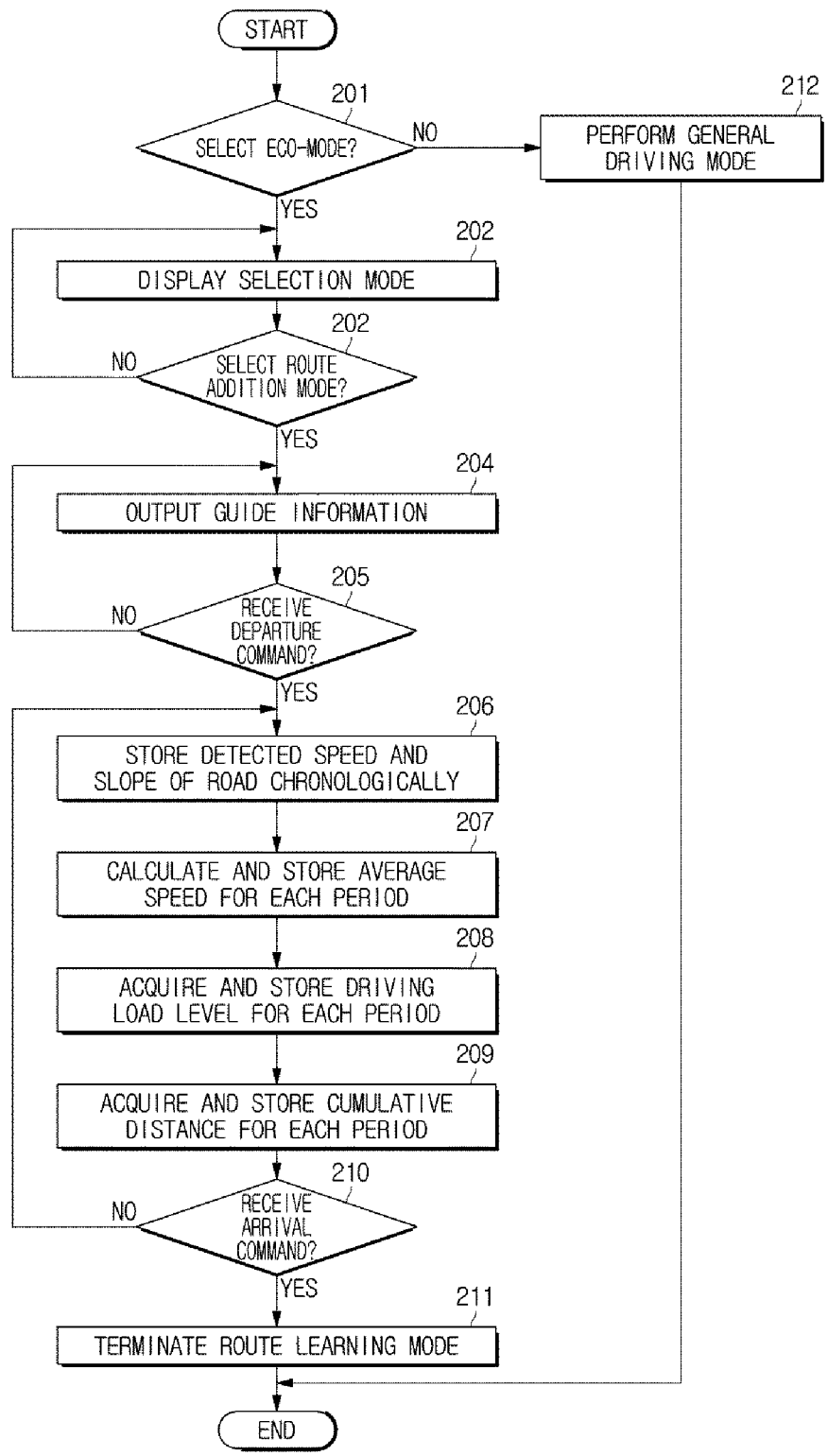
FIG. 6 is a flowchart illustrating a method of adding a route to perform an eco-mode, among methods for controlling a vehicle in accordance with exemplary embodiments of the present disclosure.

FIG. 6 is a flowchart illustrating a method of adding a route to perform the eco-mode, among a method for controlling the vehicle in accordance with an embodiment.

When the eco-mode is selected (201), the vehicle may display the selection mode that is selectable by a user, on the display 129b of the user interface (202).

The selection of the eco-mode may include selecting a button of the input provided in the head device, selecting a button of the input provided in the center fascia, or touching a button displayed on the user interface.

The selection mode may display the route addition mode for adding a new route, and at least predetermined route. The selection mode may include the route driving mode in which the operation of the motor, the battery and the engine is controlled by using the target state of charge (SOC) of the battery and the driving information of the engine corresponding to pre-stored road condition information, when the vehicle drives according to a route selected by a user.

The selection mode may further include the route learning mode for repeatedly learning the road condition for each period about a route selected by a user among the at least one predetermined route. The route learning mode may be performed wherever the route learning mode is selected by a user.

When the route driving mode is selected, the route driving mode may be performed at the same time with the route learning mode. When the number of times of the route learning is equal to or less than the predetermined number of times, the route learning mode may be automatically performed and when the number of times of the route learning exceeds the predetermined number of times, the route learning mode of the selected route may be not performed.

Figure 7:
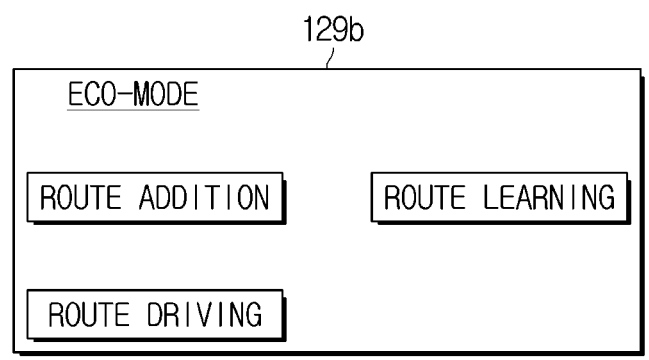
FIG. 7 is a view illustrating an example of display of eco mode of a vehicle in accordance with exemplary embodiments of the present disclosure.

As illustrated in FIG. 7, on the display 129b of the user interface, the vehicle may display the route addition, the route driving and the route learning, as the selection mode that is selectable by a user.

The selection mode may be displayed on the display of the cluster or the display of the head device.

When the route addition mode displayed on the display of the user interface is selected (203), the vehicle may output guide information for adding the route corresponding to a route addition command (204).

For example, the display of the user interface may display a route number, and a content indicating of pushing a button upon the departure and arrival.

As illustrated in FIG. 8, the display 129b of the user interface may display a content indicating entering a departure place and pushing a departure button upon the departure, and a content indicating of pushing an arrival button upon the arrival and entering a destination.

The departure button and the arrival button may correspond to the input provided in the head device, the input of the user interface and the input provided in the center fascia.

The departure button and the arrival button may be a single button. The vehicle may recognize the departure command when a user pushes the single button once, and recognize the arrival command when the user pushes the sign button again.

Before the departure, the vehicle may receive the name of the departure point and the name of the destination, or after the arrival, the vehicle may receive the name of the departure point and the name of the destination.

The vehicle may receive the name of the departure point and the name of the destination via the input of the user interface and the input provided in the center fascia.

The vehicle may output the guide information for adding the route as a sound via a speaker (not shown).

The vehicle may drive by regulating the speed based on the pressure information of the accelerator pedal and the pressure information of the brake pedal, which are detected through the first and second pressure detector.

When the vehicle receives the departure command since the departure button is selected by a user during driving or before driving (205), the vehicle may receive the speed information detected by the speed detector and the slope information detected by the slope detector from when the departure command is received, and chronologically store the received speed information and slope information at a predetermined period of time (206).

The predetermined period of time may represent a period of time for monitoring a variety of condition of the road that is needed for the learning while the vehicle drives.

That is, the vehicle may acquire the road condition information for each period, e.g., speed information corresponding to the traffic jam and the traffic lights and slope of the road information in the road in the selected route, and store the acquired road information for each period.

The vehicle may calculate an average speed at the predetermined period of time based on the speed information that is chronologically stored, and store the calculated average speed at the predetermined period of time. That is, the vehicle may calculate the average speed for each period and store the calculated average speed for each period (207).

The vehicle may acquire the speed level corresponding to the average speed for each period, and store the speed level for each period. The speed level may be divided into a plurality of levels according to average speed ranges.

For example, the vehicle may store an average speed of 0-20 km/h as a speed level 0, an average speed of 21-40 km/h as a speed level 1, an average speed of 41-60 km/h as a speed level 2, an average speed of 61-80 km/h as a speed level 3, an average speed of 81-100 km/h as a speed level 4, an average speed of 101-120 km/h as a speed level 5, and an average speed 121 km/h or more as a speed level 6.

The vehicle may chronologically store the slope information of the road and store the slope information as a slope level for each period that is divided according to a slope range.

For example, the vehicle may store a gradient of flatland as a slope level 0 (zero), a rising gradient of 5-15 degree as a slope 1, a rising gradient of 16-25 degree as a slope 2, a rising gradient of 26-35 degree as a slope 3, a rising gradient of 36 degree or more as a slope 4, a falling gradient of 5-15 degree as a slope level −1, a falling gradient of 16-25 degree as a slope level −2, a falling gradient of 26-35 degree as a slope level −3, and a falling gradient of 36 degree or as a slope level −4.

The speed range of the speed level and the gradient range of the slope level are merely examples, and thus these may be changed according to the specifications of the vehicle, e.g., the type, the weight and the size.

Figure 9:
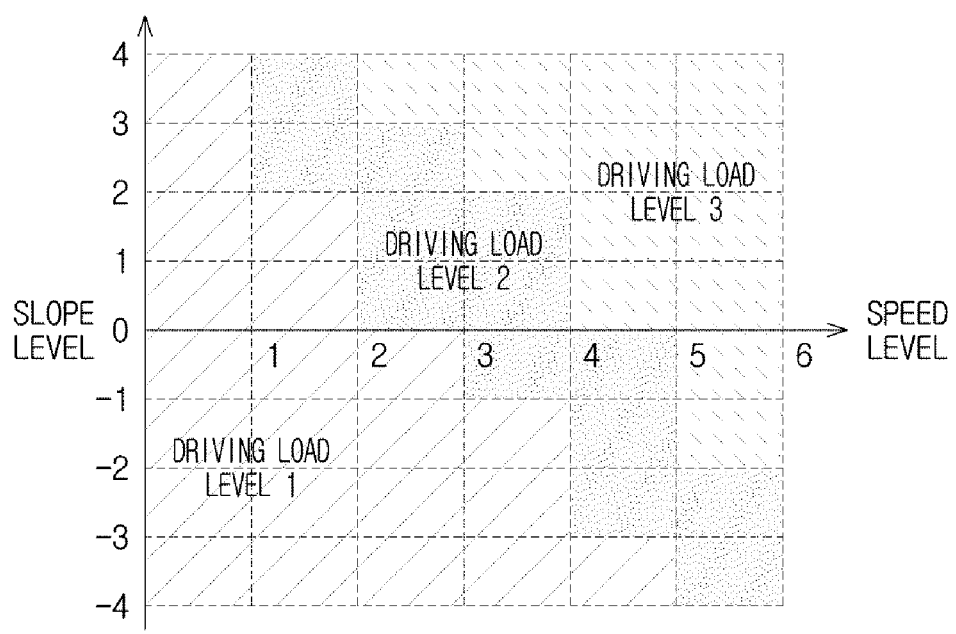
FIG. 9 is a view illustrating an example of setting a driving load level when performing route addition and learning of a vehicle in accordance with exemplary embodiments of the present disclosure.

As illustrated in FIG. 9, the vehicle may acquire the driving load level for each period based on the slope level for each period and the speed level for each period and store the acquired driving load level for each period (208).

The vehicle may acquire the cumulative distance for each period based on the speed information that is chronologically stored, and store the acquired cumulative distance for each period (209).

When the vehicle receives the arrival command (210) since a user selects the arrival button, the vehicle may terminate the route learning (211) and store information for each period, which is stored during the route learning, as reference road condition information about an added route.

That is, the vehicle may store the average speed for each period, the speed level for each period, the slope level for each period, the driving load level for each period and the cumulative distance for each period, which are acquired during driving, as the reference road condition information, which is needed to control the vehicle for the route driving mode.

Particularly, the vehicle may store the speed level for each period as the reference speed level for each period, the slope level for each period as the reference slope level for each period, and the driving load level for each period as the reference driving load level for each period.

The vehicle may store the average speed for each period as the reference average speed for each period, and the cumulative distance for each period as the reference cumulative distance for each period. During the route learning mode and the route driving mode, the vehicle may use the reference average speed and the reference cumulative distance to determine whether the vehicle drives in the same route.

When the eco-mode is not selected, the vehicle may perform the general driving mode (212). A detail description of the general driving mode will be described below.

Figure 10A:
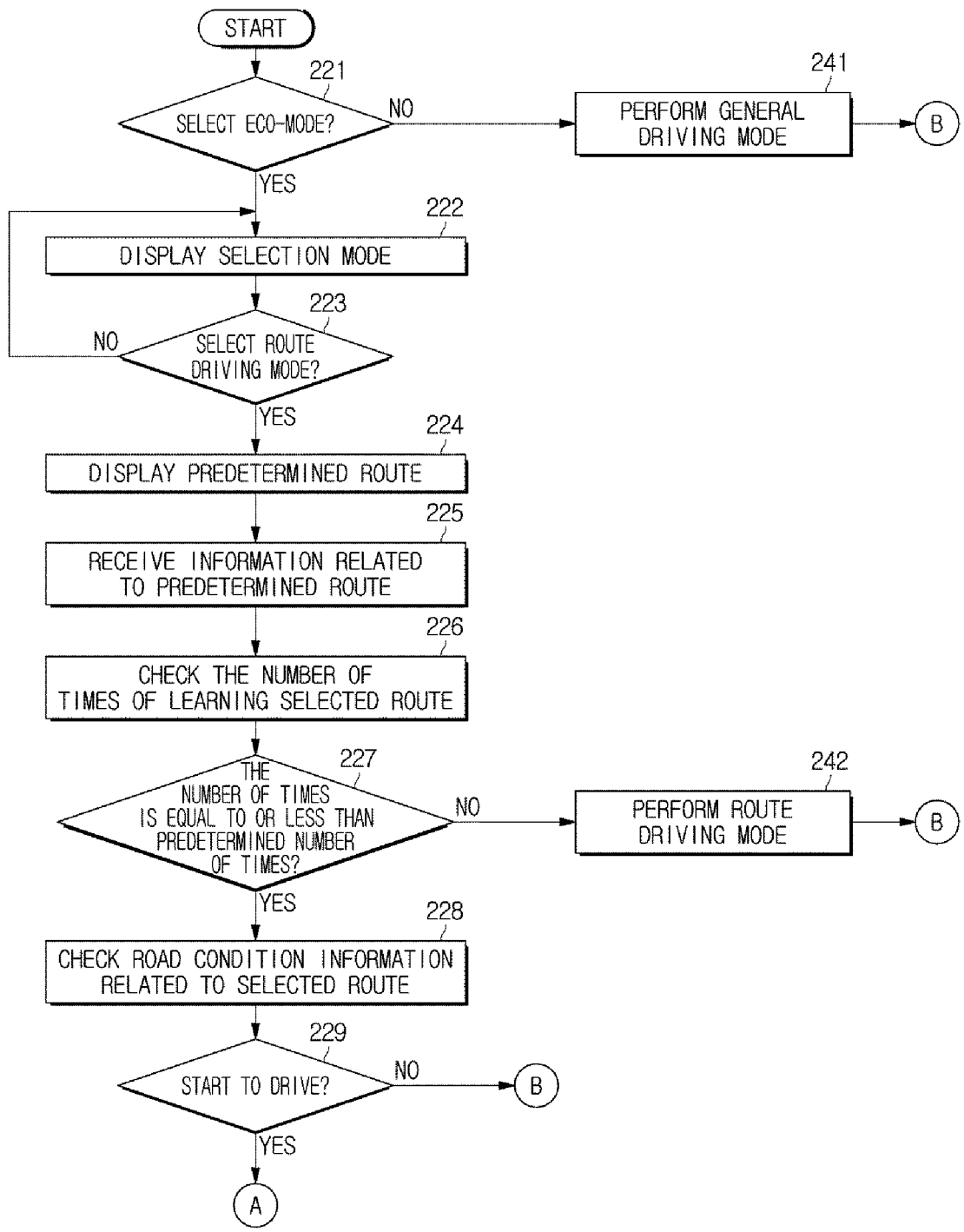
FIGS. 10A and 10B are flowcharts illustrating a case in which a vehicle performs a route learning mode in an eco-mode in accordance with exemplary embodiments of the present disclosure.
Figure 10B:
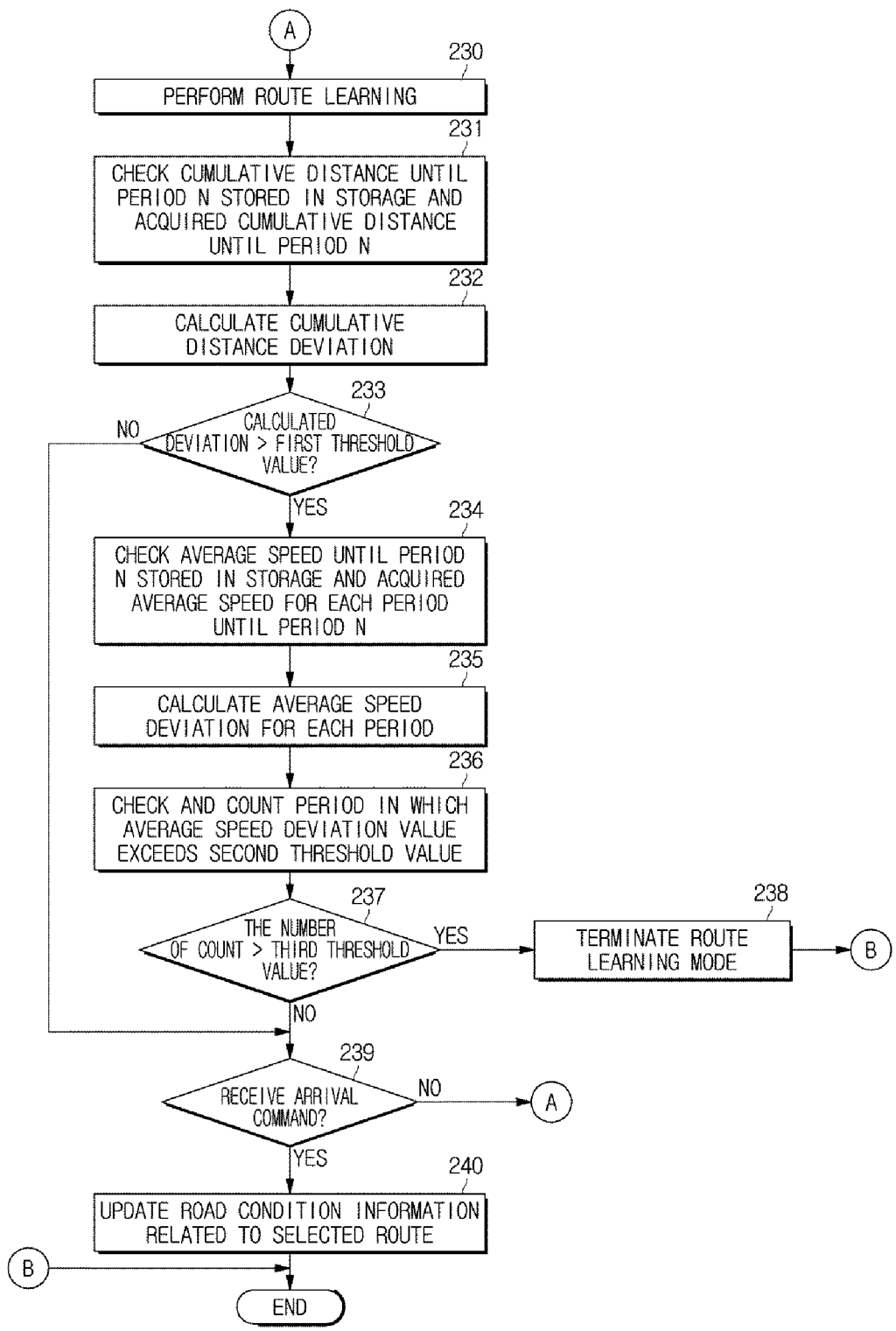

FIGS. 10A and 10B are flow charts illustrating a case in which the vehicle performs the route learning mode in the eco-mode in accordance with an embodiment, and a description thereof will be described with reference to FIGS. 11 to 13.

According to exemplary embodiments, it is assumed that the route learning mode is excluded in the selection mode selectable by a user and the route learning mode is automatically performed when the route driving mode is selected.

When the eco-mode is selected (221), the vehicle may allow the display of the user interface to display the selection mode selectable by a user (222).

That is, the vehicle may display the route addition mode and the route driving mode on the display of the user interface.

When the route driving command corresponding to the selection of the route driving mode (223) is received, the vehicle may display a predetermined route (224).

Figure 11:
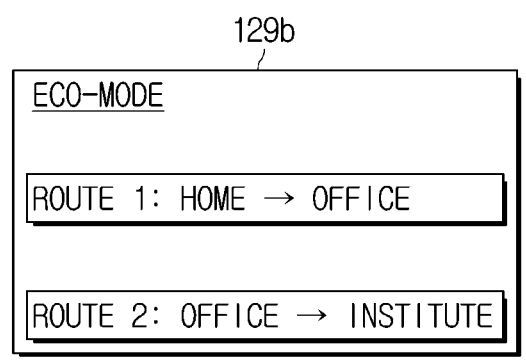
FIG. 11 is a diagram showing an example of display of a route that is set in advance when a vehicle performs a route learning and a route driving in accordance with exemplary embodiments of the present disclosure.

As illustrated in FIG. 11, when a plurality of predetermined routes is provided, the vehicle may display information related to the plurality of predetermined routes on the display 129*b* of the user interface.

For example, the display 129*b* of the user interface may display a departure point and a destination of route 1 and a departure point and a destination of route 2.

When the vehicle receives information related to a route since any one route is selected among the predetermined routes (225), the vehicle may check the number of times of route learning of the selected route (226) and determine whether the checked number of times of route learning of the selected route is a predetermined number of times.

When the checked number of times of route learning of the selected route is equal to or less than the predetermined number of times (227), the vehicle may check the road condition information about the selected route, which is stored in the storage (228).

The road condition information about the selected route may include the reference average speed for each period the reference driving load level for each period and the reference cumulative distance for each period.

The vehicle may determine whether to drive (229) based on the pressure information of the accelerator pedal and the pressure information of the brake pedal, which is detected via the first and second pressure detector, and the operation of the shift lever.

When the driving is started, the vehicle may output information related to the performance of the route learning on the display of the user interface.

When the driving is started, the vehicle may chronologically store the speed information detected via the speed detector and the slope information of the road detected by the slope detector at a predetermined period of time, and perform the route learning based on the stored information (230).

The predetermined period of time may represent a period of time for monitoring a variety of condition of the road that is needed for the learning during the vehicle drives.

The performance of the route learning may include acquiring the current average speed, the current speed level, the current slope level, and the current cumulative distance based on the speed information and the slope information that is chronologically stored, and storing the acquired current speed level, the acquired current slope level, and the acquired current cumulative distance.

Particularly, the vehicle may calculate the current average speed at the predetermined period of time, based on the speed information that is chronologically stored, and store the calculated current average speed at a predetermined period of time. That is, the vehicle may calculate the current average speed for each period and store the calculated average speed for each period.

The vehicle may acquire the current speed level for each period corresponding to the current average speed, and store the current speed level for each period. The vehicle may chronologically store the slope information of the road and store the current slope level for each period, which is classified by the gradient range.

The vehicle may acquire the current driving load level for each period based on the current slope level for each period and the current speed level for each period and, store the acquired current driving load level for each period.

The vehicle may acquire the current cumulative distance for each period based on the speed information that is chronologically stored, and store the acquired current cumulative distance for each period.

The above-mentioned vehicle may store the road condition information, which is acquired for each period, while determining whether a route in which the vehicle currently drives is the same as a predetermined route, for each period.

The determination of whether the current driving route is the same as the predetermined route, may include comparing the road condition information of the predetermined route with the road condition information of the current driving route, for each period and determining whether the current driving route is the same as the predetermined route based on the result of the comparison.

Particularly, the vehicle may determine a current period (period n) based on a period of time elapsed from a departure time, and check a reference cumulative distance until the period n (current period) in the road condition information stored in the storage.

The vehicle may check the current cumulative distance until the period n (current period) in the road condition information that is acquired during the driving (231).

The vehicle may calculate a cumulative distance deviation between the reference cumulative distance and the current cumulative distance (232), and determine whether the calculated deviation value exceeds the first predetermined threshold.

Figure 12:
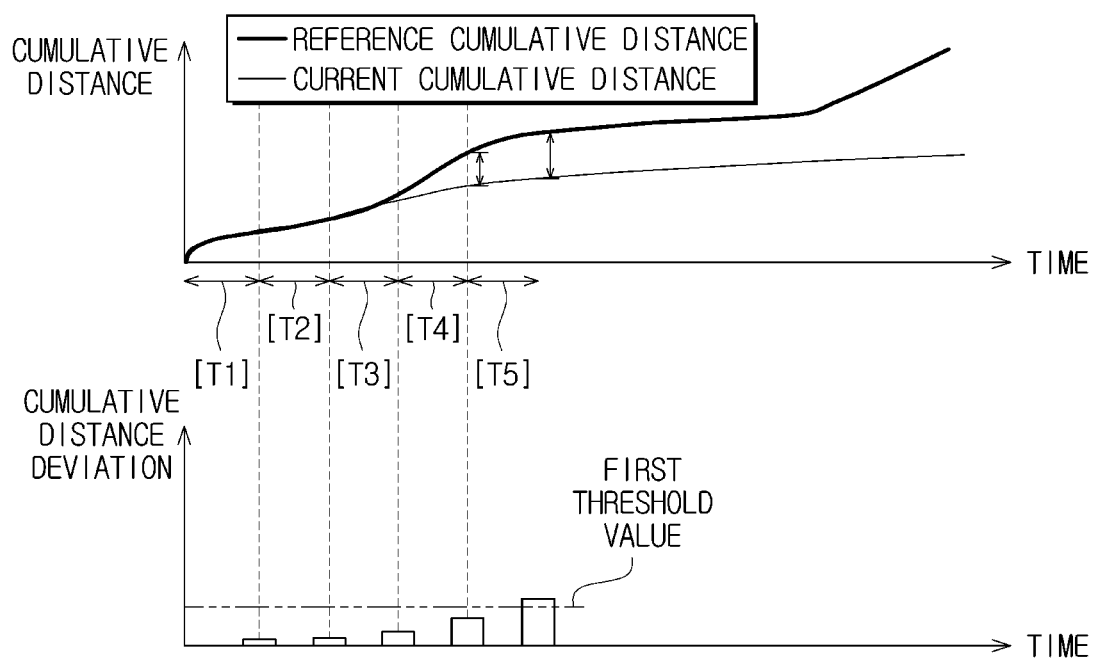
FIG. 12 is a graph showing cumulative distance deviations when a vehicle performs a route learning and a route driving in accordance with exemplary embodiments of the present disclosure.

As illustrated in FIG. 12, when the current period is T1, the vehicle may calculate a cumulative distance deviation value between a reference cumulative distance in T1, which is the pre-stored cumulative distance for each period, and a cumulative distance in the current period T1, and compare the calculated deviation value in T1 with the first threshold value. When the calculated deviation value in T1 is equal to or less than the first threshold value, the vehicle may acquire road condition information in T2.

When the current period is T2, the vehicle may calculate a cumulative distance deviation value between a reference cumulative distance in T2, which is in the pre-stored reference cumulative distance for each period, and a cumulative distance in the current period T2, and compare the calculated deviation value in T2 with the first threshold value. When the calculated deviation value in T2 is equal to or less than the first threshold value, the vehicle may acquire road condition information in T3.

Through the above mentioned process, the vehicle may calculate a cumulative distance deviation value between a reference cumulative distance for each period and a current cumulative distance. When the calculated deviation value is equal to or less than the first threshold value, the vehicle may maintain the driving learning until the arrival command is received.

When the calculated deviation value is greater than the first threshold value, the vehicle may determine whether to change the route based on an average speed prior to the current period (period n).

As illustrated in FIG. 12, when the current period is T5, the vehicle may calculate a cumulative distance deviation value between a reference cumulative distance in T5, which is in the pre-stored reference cumulative distance for each period, and a cumulative distance in the current period T5. When it is determined that the calculated deviation value in T5 is greater than the first threshold value, the vehicle may check a reference average speed for each period, prior to the current period (period n) in the reference average speed stored in the storage, and check a current average speed for each period prior to n period (current period) (234).

The vehicle may calculate an average speed deviation value between the reference average speed and the current average speed, for each period (235).

The vehicle may check which period exceeds the second predetermined threshold value in the calculated average speed deviation for each period, and count the number of the period exceeding the second threshold value (236).

Figure 13:
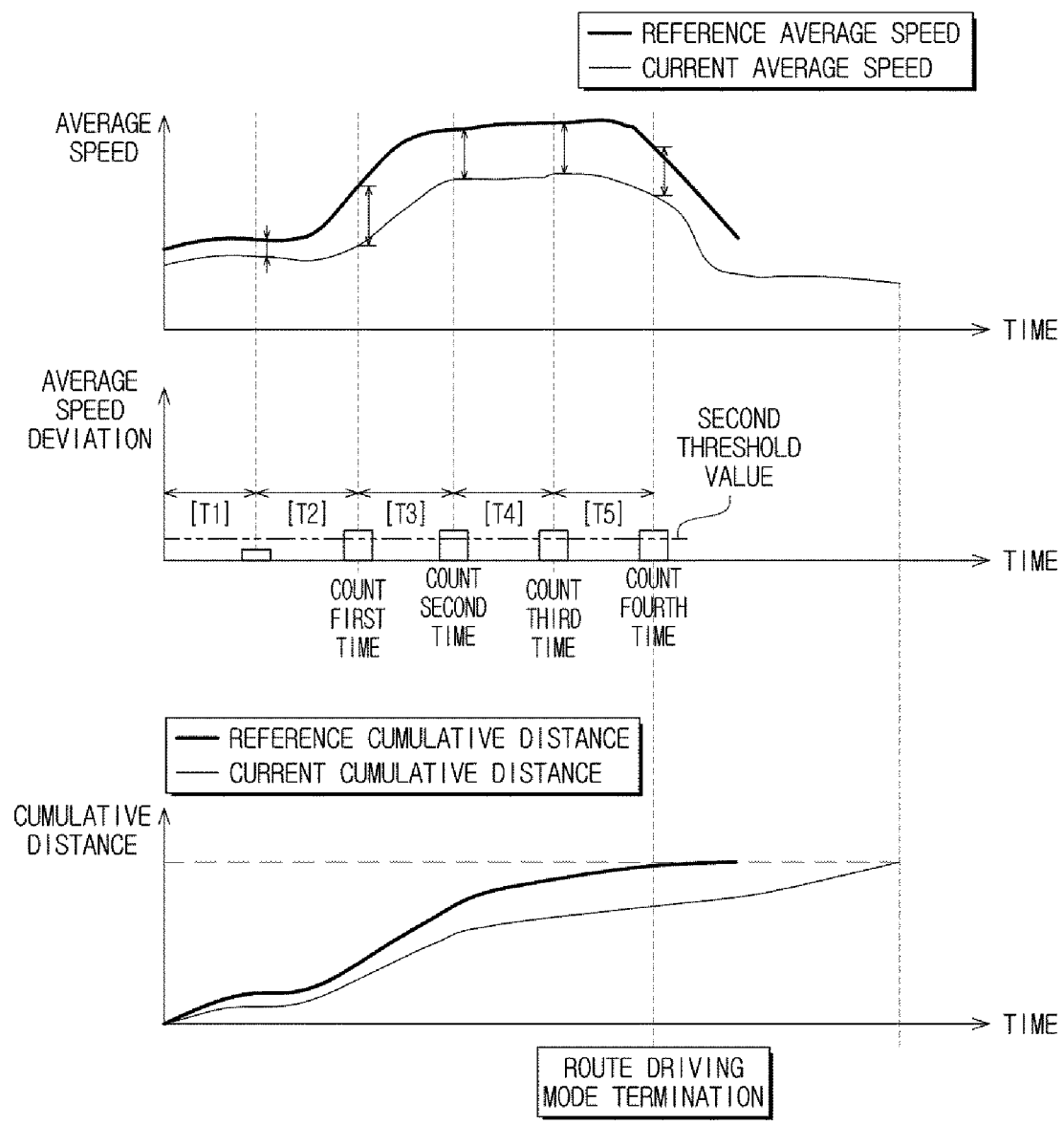
FIG. 13 is a graph showing average speed deviation values when a vehicle performs a route learning and a route driving in accordance with exemplary embodiments of the present disclosure.

As illustrated in FIG. 13, the vehicle may count the number of T2, T3, T4 and T5, in which the average speed deviation value exceeds the second threshold value. That is, the vehicle may acquire a count number 4.

The vehicle may compare the counted number with the third threshold value and determine whether the counted number exceeds the third threshold value (237), and when it is determined that the counted number exceeds the third threshold value, the vehicle may terminate the route learning mode (238). When it is determined the counted number is equal to or less than the third threshold value, the vehicle may determine whether the arrival command is received or not (239).

That is, while driving until the arrival command is received, the vehicle may acquire the road condition information for each period, and perform the route learning based on the acquired road condition information for each period.

When it is determined that the arrival command is received, the vehicle may update the reference road condition information stored in the storage, based on the current road condition information (240), and store the updated road condition information as new reference road condition information.

Particularly, for each period, the vehicle may calculate a driving load level average value between the reference driving load level and the current driving load level, and store the calculated driving load level average value for each period as a new reference driving load level.

For each period, the vehicle may calculate an average value of the average speed for each period between the reference average speed and the current average speed, and acquire a new reference average speed based on the average value of the average speed for each period. The vehicle may store the acquired new reference average speed.

For each period, the vehicle may calculate a cumulative distance average value between the reference cumulative distance and the current cumulative distance, and store the acquired new reference cumulative distance as a new reference cumulative distance based on the calculated cumulative distance average value for each period.

When the eco-mode is not selected, the vehicle may perform the general driving mode (241). A configuration of the general driving mode, or modes, will be described below.

In addition, when the number of times of the route learning of the selected route exceeds a predetermined number of times, the vehicle may perform the route driving mode (242).

A configuration of the performance of the route driving mode will be described with reference to FIGS. 14A and 14B.

Figure 14A:
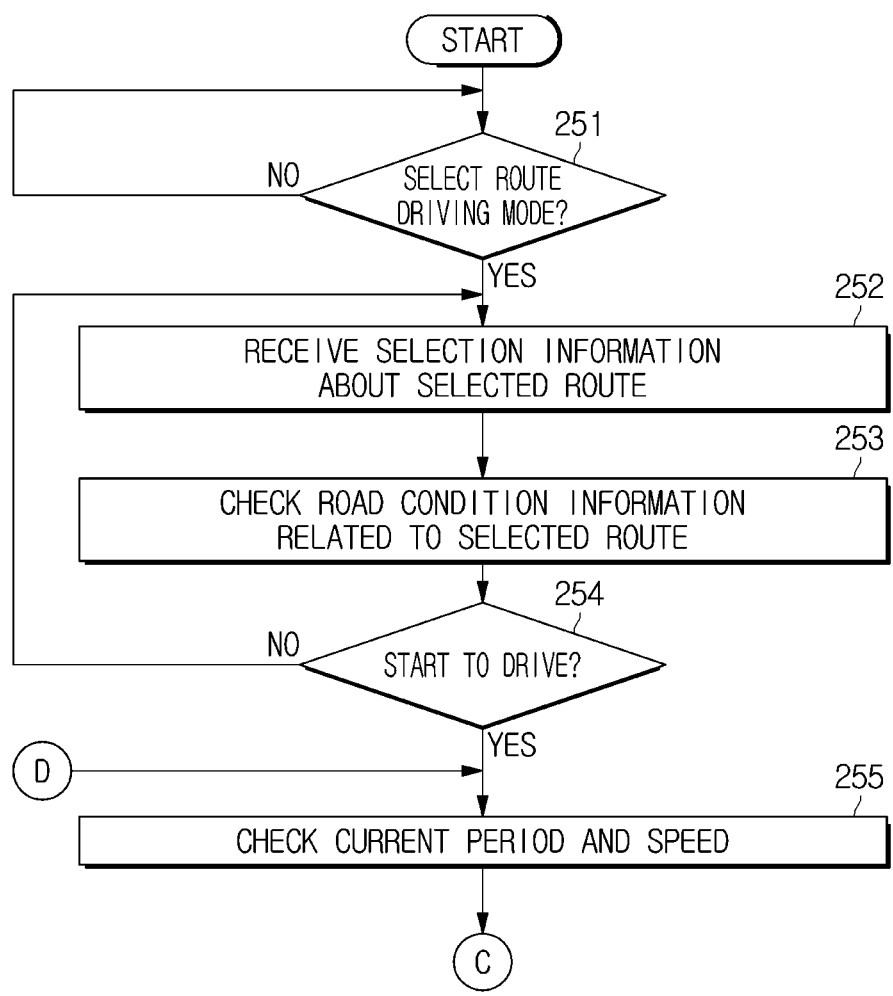
FIGS. 14A and 14B are flowcharts illustrating a case in which a vehicle performs a route driving mode in accordance with exemplary embodiments of the present disclosure.
Figure 14B:
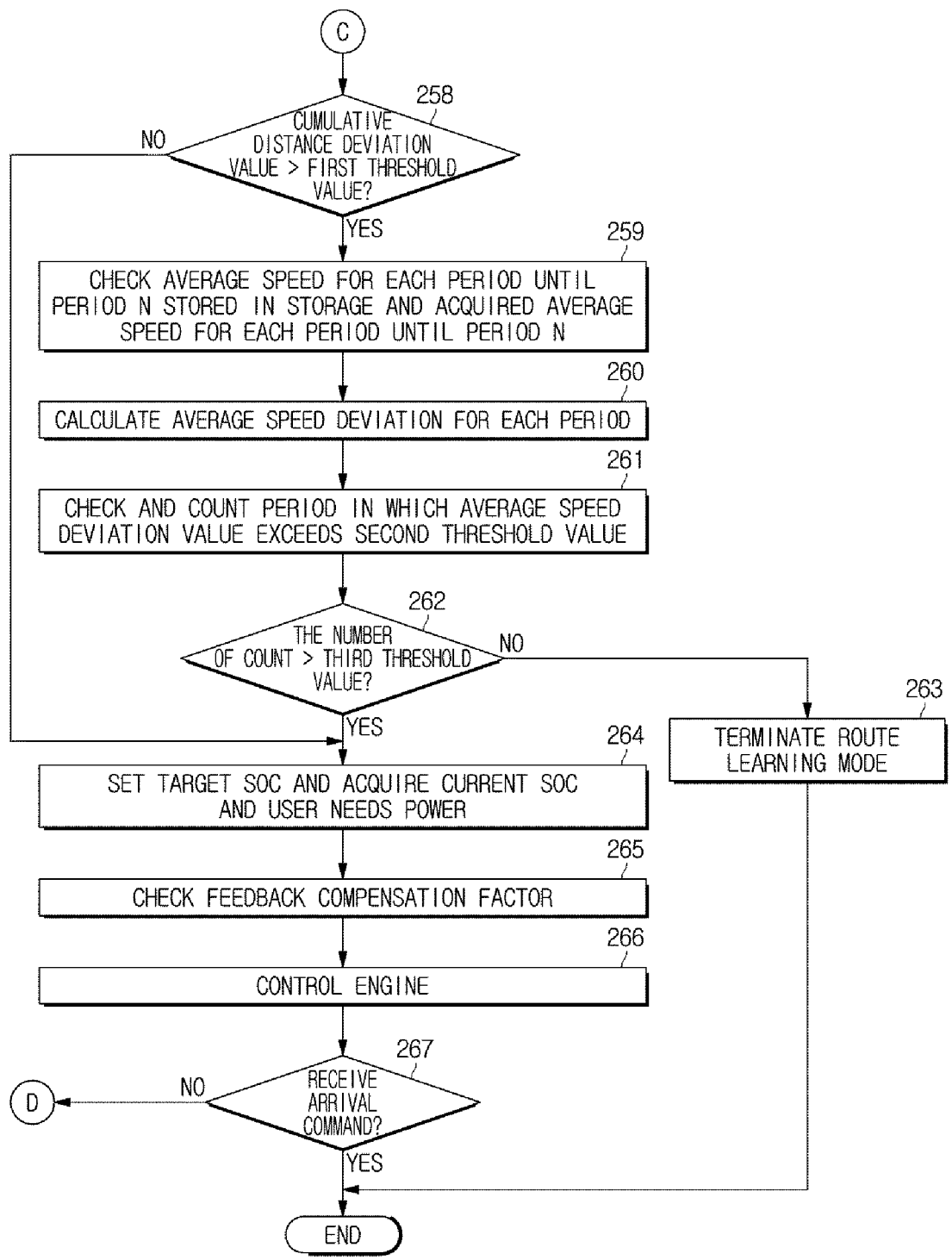

FIGS. 14A and 14B are flowcharts illustrating a case in which the vehicle performs the route driving mode in accordance with an embodiment, and a description thereof will be described with reference to FIGS. 11 to 13 and FIGS. 15 and 16.

When the eco-mode is selected, the vehicle may allow the display of the user interface to display the selection mode selectable by a user.

That is, the vehicle may allow the display of the user interface to display the route addition mode and the route driving mode.

When the route driving command corresponding to the selection of the route driving mode (251) is received, the vehicle may display a predetermined route (252).

As illustrated in FIG. 11, when a plurality of predetermined routes is provided, the vehicle may display information related to the plurality of predetermined routes on the display 129b of the user interface.

For example, the display 129b of the user interface may display the departure point and the destination of route 1 and the departure point and the destination of route 2.

When the vehicle receives information related to a route, since any one route is selected among the predetermined routes (252), the vehicle may check the road condition information stored in the storage corresponding to the selected route (253).

The road condition information about the selected route may include the reference average speed for each period, the reference driving load level for each period and the reference cumulative distance for each period.

The vehicle may determine whether to drive (254) based on the pressure information of the accelerator pedal and the pressure information of the brake pedal, which is detected via the first and second pressure detector, and the operation of the shift lever.

When the driving is started, the vehicle may output information related to the route driving mode via the display of the user interface.

For example, the vehicle may display the name of the selected route or the departure point and the destination, on the display of the user interface.

When the driving is started, the vehicle may check a period corresponding to the passage of the driving time, and check speed information detected by the speed detector (255).

Checking the user needs power may include acquiring a pressure applied to the accelerator pedal based on the pressure information detected by the first pressure detector, acquiring a pressure applied to the brake pedal based on the pressure information detected by the second pressure detector, acquiring a current driving speed corresponding to the speed information detected by the speed detector, acquiring user needs power based on the acquired pressure of the accelerator pedal, the acquired pressure of the brake pedal, and the acquired current driving speed and checking the acquired user needs power.

While driving, the vehicle may determine whether the vehicle deviates from the selected route, which is selected by a user, based on the current cumulative distance for each period and the current average speed for each period.

Particularly, while driving, the vehicle may acquire a cumulative distance for each period and average speed for each period until the current period (period n) based on the detected speed information, and store the acquired current cumulative distance and current average speed for each period.

The vehicle may check a reference cumulative distance until the period n, stored in the storage.

That is, the vehicle may check the reference cumulative distance until the period n stored in the storage, and check the current cumulative distance until the current period (period n) (256). The vehicle may compare the reference cumulative distance with the current cumulative distance and calculate a cumulative distance deviation value between the reference cumulative distance and the current cumulative distance (257).

The vehicle may determine whether the cumulative distance deviation value exceeds the first threshold value by comparing the cumulative distance deviation value with the first threshold value (258).

As illustrated in FIG. 12, when the current period is T1, the vehicle may calculate a cumulative distance deviation value between a reference cumulative distance in T1 and a cumulative distance in the current period T1, and determine whether the calculated deviation value in T1 exceeds the first threshold value. When the calculated deviation value in T1 is equal to or less than the first threshold value, the vehicle may acquire road condition information in T2.

Through the above mentioned process, the vehicle may calculate a cumulative distance deviation value between a reference cumulative distance for each period and a current cumulative distance, and when the calculated deviation value is equal to or less than the first threshold value the vehicle may maintain the route driving mode until the arrival command is received.

When it is determined that the calculated deviation value is greater than the first threshold value, the vehicle may check the reference average speed for each period until the period n, stored in the storage and check the current average speed for each period until the current period (period n) (259).

As illustrated in FIG. 12, when the current period is T5, the vehicle may calculate a cumulative distance deviation value between a reference cumulative distance in T5 and a current cumulative distance in the current period T5. When it is determined that the calculated deviation value in T5 is greater than the first threshold value, the vehicle may check a reference average speed for each period, prior to the period n, stored in the storage, and check a current average speed for each period prior to the period n (current period).

The vehicle may calculate an average speed deviation value for each period between the reference average speed for each period and the current average speed for each period (260). The vehicle may check which period exceeds the second predetermined threshold value, in the calculated average speed deviation for each period, and count the number of the period exceeding the second threshold value (261).

As illustrated in FIG. 13, the vehicle may count the number of T2, T3, T4 and T5, in which the average speed deviation value exceeds the second threshold value. That is the vehicle may acquire a count number 4.

The vehicle may compare the counted number with the third threshold value and determine whether the counted number exceeds the third threshold value (262), and when the counted number exceeds the third threshold value, the vehicle may terminate the route learning mode (263) and perform the general driving mode.

The performance of the general driving mode may include checking a current state of charge of the battery, checking a driving speed, acquiring information related to turning on and off of the engine corresponding to the state of charge of the battery and the driving speed of the vehicle, from the first map stored in the storage, and controlling the engine based on the acquired information related to turning on and off of the engine.

When turning on the engine, the vehicle may check the user needs power, check a current RPM of the engine, acquire a target output torque of the engine corresponding to the user needs power and the RPM of the engine, from the second map stored in the storage, and control the rotation of the engine based on the acquired target output torque of the engine.

When it is determined that the counted number is equal to or less than the third threshold value, the vehicle may determine that the route selected by the user is the same as the predetermined route and maintain the route driving mode until the arrival command is received.

Hereinafter, a case in which the route driving mode is performed when it is assumed that the route selected by the user is the same as the predetermined route, will be described.

During the route driving mode, the vehicle may set a target state of charge and acquire the current state of charge and the user needs power (264).

A description thereof will be described in details.

Figure 15:
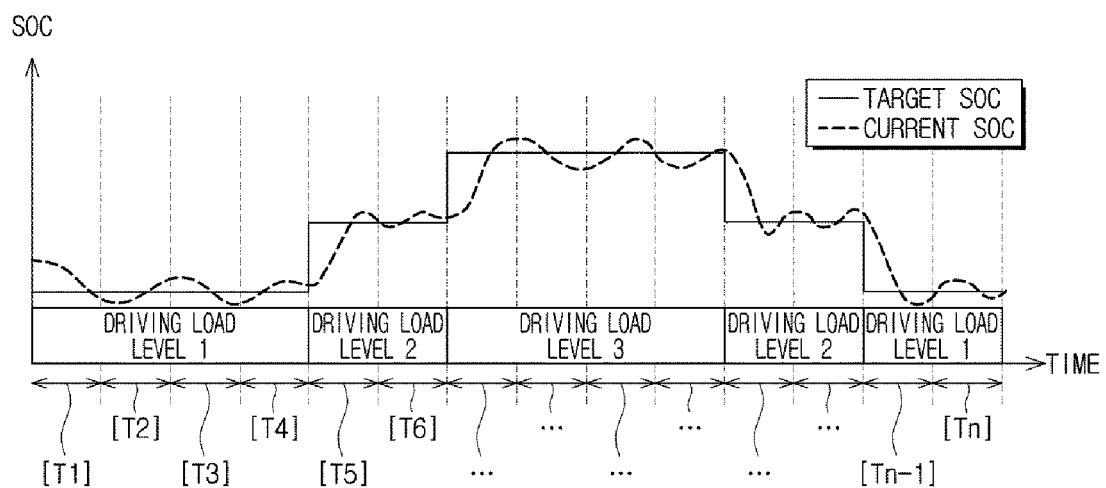
FIG. 15 is a graph of a state of charge of a battery of a vehicle in accordance with exemplary embodiments of the present disclosure.

As illustrated in FIG. 15, the vehicle may check the driving load level for each period until period Tn stored in the storage, and set a target state of charge (SOC) based on the checked driving load level for each period. In this case, as the driving load level is increased, the target state of charge may be set to be higher.

This is in order to increase a period of time in which the vehicle drives in the EV mode by more reducing the target state of charge in a section having a lower driving load level, e.g., a traffic jam section and a traffic signal section. In addition, this is in order to increase the charge amount of the battery by the driving of the engine by more increasing the target state of charge of the battery in a section having a higher level.

The vehicle may acquire the current state of charge (SOC) of the battery.

Acquiring the state of charge of the battery may include an operation in which the battery manager of the vehicle detects the voltage, the current, and the temperature of the battery, calculates a charge amount of the battery based on the detected voltage and current, compensates the calculated charge amount of the battery based on the detected temperature and acquires the compensated charge amount of the battery.

The vehicle may acquire a user needs power.

Figure 16:
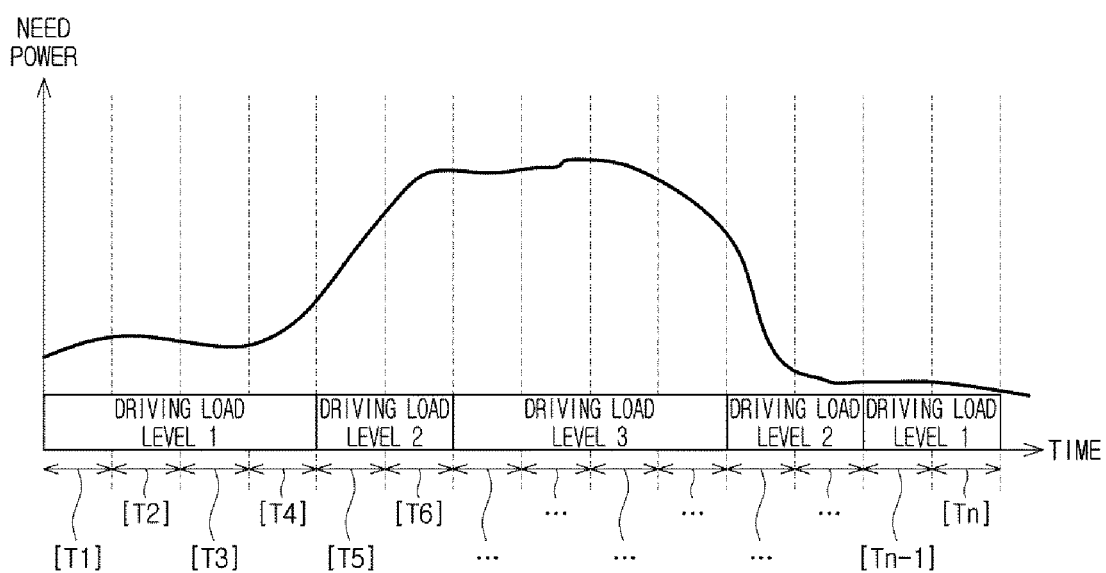
FIG. 16 is a graph of user power needs, or need power, of the vehicle in accordance with exemplary embodiments of the present disclosure.

As illustrated in FIG. 16, the user needs power may vary according to the road condition information, i.e., the driving load level.

Acquiring the user needs power may include acquiring a pressure applied to the accelerator pedal based on the pressure information detected by the first pressure detector, acquiring a pressure applied to the brake pedal based on the pressure information detected by the second pressure detector, acquiring a current driving speed corresponding to the speed information detected by the speed detector, acquiring the user needs power based on the acquired pressure of the accelerator pedal, the acquired pressure of the brake pedal, and the acquired current driving speed and acquiring the acquired user needs power.

The vehicle may calculate a difference between the current state of charge (SOC) and the target state of charge (SOC).

Calculating the difference between the current state of charge (SOC) and the target state of charge (SOC) may include calculating an amount of charge difference between the current charge amount of the battery and the target charge amount of the battery.

The vehicle may check the driving load level of the current period, and check a feedback compensation factor corresponding to the difference in the amount of charge of the current period and the driving load level from the third map stored in the storage (265).

The vehicle may acquire information related to turning on and off the engine corresponding to the current state of charge of the battery and the driving speed from the first map stored in the storage, compensate the acquired information related to turning on and off the engine based on the feedback compensation factor, and determine whether to turn on or off the engine based on the result of the compensation.

When turning on the engine, the vehicle may check the user needs power, check the current RPM of the engine, acquire the output torque of the engine corresponding to the user needs power and the RPM of the engine from the second map stored in the storage, compensate the acquired target output torque of the engine based on the feedback compensation factor, and perform the feedback control on the rotation of the engine based on the compensated target output torque of the engine (266).

This will be described with an example.

It is assumed that the user needs torque and the RPM of the engine of the current period is the same as in the next period. In addition, it is assumed that the driving load level of the current period (e.g., period 1) is two, the driving load level of the next period (e.g., period 2) is three, the driving load level of the period after next period (e.g., period 3) is one and the difference in the charge of amount between the current state of charge and the target state of charge is the same.

In the current period (e.g., period 1), the vehicle may maintain the target output torque of the engine corresponding to the user needs power and the RPM of the engine. In the next period (e.g., period 2), the vehicle may increase the target output torque corresponding to the user needs power and the RPM of the engine based on the feedback compensation factor and control the rotation of the engine based on the increased target output torque. In the period after next period (e.g., period 3), the vehicle may reduce the target output torque corresponding to the user needs power and the RPM of the engine based on the feedback compensation factor, and control the rotation of the engine based on the reduced target output torque.

That is, the vehicle may increase the charge amount of the battery by increasing the target state of charge of the battery and the target output torque of the engine in the section having the high driving load level. The vehicle may increase the utilization of the motor and the battery by reducing the target charge amount of the battery in the section having the low driving load level. Accordingly, it is possible to minimize the turning on of the engine or the target output torque of the engine so that the fuel efficiency is improved.

The vehicle may drive the engine at a proper timing by estimating the road conditions based on the road condition information that is pre-stored, and the vehicle may variably control the engine at the optimized RPM when driving the engine, thereby more increasing the target state of charge of the battery in the section in which the charge efficiency is dominant.

In a state in which the vehicle drives in the route driving mode, when it is estimated that the vehicle should slow down ahead, the vehicle may inform of a user a point of time when the pressure of the accelerator pedal is released, or information related to the climbing and descending, in advance, on the display of the user interface.

Accordingly, it may be possible to improve the fuel efficiency by reducing the sudden braking performed by a user and by increasing the coasting time. In addition, when the uphill road is estimated, the vehicle may charge the battery in advance to maximize the utilization of the motor.

When the arrival command is received (267), the vehicle may terminate the route driving mode.

Determining that the arrival command is received may include determining whether the arrival button is selected and determining whether the ignition is turned off.

As is apparent from the above description, it may be possible to learn conditions of the road, which is contained in the route, based on at least one of the driving speed and the slope in the route, and the vehicle may selectively drive the motor and the engine according to the result of the learning so that the improvement of the fuel efficiency is maximized and the emissions are minimized.

Since the fuel efficiency is improved, it may be possible to improve the commercial value of hybrid electric vehicles (HEV) and plug-in hybrid electric vehicles (PHEV) which are driven by the motor, and further it may be possible to increase the user experience and secure the competitiveness.

It may be possible to convert the state of charge of battery into the low state in the urban area in which the vehicle performs stop-go driving in heavy traffic, and thus it may be possible to improve the fuel efficiency by reducing the power consumption for charging the battery.

Although some embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an engine for applying a first driving force to a vehicle wheel;
a speed detector for detecting a driving speed;
a slope detector for detecting a slope of a road;
an input for receiving a departure command and an arrival command;
a motor for applying a second driving force to the vehicle;
a battery for supplying electrical energy to the motor; and
a controller configured to, when a route addition mode is selected, acquire and store road condition information of a route between a departure time and an arrival time based on a driving speed and a slope of the road, which is detected from when the departure time at which the departure command is received until the arrival time at which the arrival command is received, and to, when a route driving mode is selected, control driving of the engine, driving of the motor and charging of the battery based on the stored road condition information of the road,
wherein the controller, when a route learning mode is selected among the route driving mode, is further configure to:
chronologically acquire the driving speed and the slope and the road detected during driving,
acquire a cumulative distance for each period and an average speed for each period based on the driving speed which is chronologically acquired,
determine whether the vehicle deviates from the route based on at least one of the acquired cumulative distance or average speed for each period and a cumulative distance and average speed for each period corresponding to the stored road condition information, and
terminate the route learning mode when it is determined that the vehicle deviates from the route.

2. The vehicle of claim 1, wherein when the route driving mode is selected, the controller checks the number of times of route learning of the route, and when the checked number of times of route learning is equal to or less than a predetermined number of times, the controller performs the route learning mode, and when the checked number of times of route learning exceeds the predetermined number of times, the controller performs the route driving mode,
wherein when the route learning mode is selected, the controller chronologically stores the driving speed and the slope of the road detected during driving.

3. The vehicle of claim 1, wherein when the route addition mode is selected, the controller chronologically stores the driving speed and the slope between the departure time and the arrival time, acquires a speed level for each period based on the driving speed which is chronologically stored, acquires a slope level for each period based on the slope which is chronologically stored, acquires and stores a driving load level for each period based on the speed level for each period and the slope level for each period, and acquires and stores a cumulative distance for each period and an average speed for each period based on the driving speed which is chronologically stored.

4. The vehicle of claim 3, wherein when the route learning mode is selected, the controller acquires a driving load level based on the driving speed and the slope of the road which is chronologically stored, and updates the stored driving load level, based on the acquired driving load level.

5. The vehicle of claim 4, wherein when the route learning mode is selected, during driving, the controller updates the cumulative distance and the average speed, which is stored in a storage, based on the acquired cumulative distance and average speed.

6. The vehicle of claim 5, wherein when performing the route learning mode, the controller determines whether the vehicle deviates from the route based on the acquired cumulative distance for each period and the stored cumulative distance for each period, and when it is determined that the vehicle deviates from the route, the controller terminates the route learning mode.

7. The vehicle of claim 1, wherein when performing the route learning mode, the controller determines whether the vehicle deviates from the route based on the acquired average speed for each period and the stored average speed for each period, and when it is determined that the vehicle deviates from the route, the controller terminates the route learning mode.

8. The vehicle of claim 3, further comprising:
a storage for storing a map matched with a feedback compensation factor in which a difference in a charge amount corresponds to the driving load level, wherein the controller sets a target state of charge based on the stored driving load level for each period, acquires the difference in the charge amount by comparing the set target state of charge with a state of charge of the battery of the battery manger, checks a feedback compensation factor corresponding to the acquired difference in the charge amount and the stored driving load level for each period, from the storage, and compensates driving information of the engine based on the checked feedback compensation factor.

9. The vehicle of claim 1, wherein the controller when it is determined that the vehicle deviates from the route, terminates the route driving mode and performs a general driving mode.

10. The vehicle of claim 1, further comprising a display for displaying guide information about adding a route when the route addition mode is selected.

* * * * *